United States Patent
Willcox et al.

(10) Patent No.: US 11,941,239 B2
(45) Date of Patent: Mar. 26, 2024

(54) SYSTEM AND METHOD FOR ENHANCED COLLABORATIVE FORECASTING

(71) Applicant: Unanimous A. I., Inc., Arlington, VA (US)

(72) Inventors: Gregg Willcox, Seattle, WA (US); Louis B. Rosenberg, San Luis Obispo, CA (US)

(73) Assignee: Unanimous A.I., Inc., Arlington, VA (US)

( * ) Notice: Subject to any disclaimer, the term of this patent is extended or adjusted under 35 U.S.C. 154(b) by 70 days.

(21) Appl. No.: 17/744,479

(22) Filed: May 13, 2022

(65) Prior Publication Data

US 2022/0276775 A1 Sep. 1, 2022

Related U.S. Application Data

(63) Continuation of application No. 17/024,474, filed on Sep. 17, 2020, now Pat. No. 11,360,655, which is a
(Continued)

(51) Int. Cl.
*G06F 3/04847* (2022.01)
*G06Q 50/00* (2012.01)
(Continued)

(52) U.S. Cl.
CPC .......... *G06F 3/04847* (2013.01); *E21B 44/00* (2013.01); *E21B 47/13* (2020.05);
(Continued)

(58) Field of Classification Search
CPC .. G06F 3/04847; G06F 3/04842; E21B 47/13; E21B 44/00; E21B 47/18;
(Continued)

(56) References Cited

U.S. PATENT DOCUMENTS

| 5,236,199 A | 8/1993 | Thompson, Jr. |
| 5,400,248 A | 3/1995 | Chisholm |

(Continued)

FOREIGN PATENT DOCUMENTS

| CA | 2414397 | 8/2003 |
| EP | 3123442 | 2/2017 |

(Continued)

OTHER PUBLICATIONS

"Dialogr—A simple tool for collective thinking"; Mar. 25, 2015; http://www.dialogr.com./; 1 page.
(Continued)

*Primary Examiner* — Jeremy L Stanley
(74) *Attorney, Agent, or Firm* — Fitch, Even, Tabin & Flannery LLP

(57) ABSTRACT

Systems and methods for amplifying the collective intelligence of networked human groups engaged in collaborative forecasting of future events having two possible outcomes. During a real-time session a computing device for each user displays a forecasting prompt and a dynamic user interface which includes a user-manipulatable marker moved by the user between a first limit and a second limit, where the position of the marker defines a forecasted probability of each possible outcome. The display also includes a first reward value and a second reward value, both of which are interactively responsive to the marker position. During a first time period, users manipulate the markers. After the first time period, a perturbation stimulus is displayed. During a second time period, users again manipulate the markers. After the second time period, a final group forecast is calculated based on the data collected during the first and second time periods.

6 Claims, 11 Drawing Sheets

Related U.S. Application Data continuation of application No. 16/356,777, filed on Mar. 18, 2019, now Pat. No. 10,817,159, which is a continuation-in-part of application No. 16/230,759, filed on Dec. 21, 2018, now Pat. No. 10,817,158, which is a continuation-in-part of application No. 16/154,613, filed on Oct. 8, 2018, now Pat. No. 11,269,502, which is a continuation-in-part of application No. 16/059,698, filed on Aug. 9, 2018, now Pat. No. 11,151,460, which is a continuation-in-part of application No. 15/922,453, filed on Mar. 15, 2018, now abandoned, which is a continuation-in-part of application No. 15/904,239, filed on Feb. 23, 2018, now Pat. No. 10,416,666, which is a continuation-in-part of application No. 15/898,468, filed on Feb. 17, 2018, now Pat. No. 10,712,929, which is a continuation-in-part of application No. 15/815,579, filed on Nov. 16, 2017, now Pat. No. 10,439,836, which is a continuation-in-part of application No. 15/640,145, filed on Jun. 30, 2017, now Pat. No. 10,353,551, which is a continuation-in-part of application No. 15/241,340, filed on Aug. 19, 2016, now Pat. No. 10,222,961, which is a continuation-in-part of application No. 15/199,990, filed on Jul. 1, 2016, now abandoned, which is a continuation-in-part of application No. 15/086,034, filed on Mar. 30, 2016, now Pat. No. 10,310,802, which is a continuation-in-part of application No. 15/052,876, filed on Feb. 25, 2016, now Pat. No. 10,110,664, which is a continuation-in-part of application No. 15/047,522, filed on Feb. 18, 2016, now Pat. No. 10,133,460, which is a continuation-in-part of application No. 15/017,424, filed on Feb. 5, 2016, now abandoned, which is a continuation-in-part of application No. 14/925,837, filed on Oct. 28, 2015, now Pat. No. 10,551,999, which is a continuation-in-part of application No. 14/920,819, filed on Oct. 22, 2015, now Pat. No. 10,277,645, which is a continuation-in-part of application No. 14/859,035, filed on Sep. 18, 2015, now Pat. No. 10,122,775, which is a continuation-in-part of application No. 14/738,768, filed on Jun. 12, 2015, now Pat. No. 9,940,006, which is a continuation-in-part of application No. 14/708,038, filed on May 8, 2015, now abandoned, which is a continuation-in-part of application No. 14/668,970, filed on Mar. 25, 2015, now Pat. No. 9,959,028.

(60) Provisional application No. 62/648,424, filed on Mar. 27, 2018, provisional application No. 62/611,756, filed on Dec. 29, 2017, provisional application No. 62/569,909, filed on Oct. 9, 2017, provisional application No. 62/552,968, filed on Aug. 31, 2017, provisional application No. 62/544,861, filed on Aug. 13, 2017, provisional application No. 62/473,424, filed on Mar. 19, 2017, provisional application No. 62/473,442, filed on Mar. 19, 2017, provisional application No. 62/473,429, filed on Mar. 19, 2017, provisional application No. 62/463,657, filed on Feb. 26, 2017, provisional application No. 62/460,861, filed on Feb. 19, 2017, provisional application No. 62/423,402, filed on Nov. 17, 2016, provisional application No. 62/358,026, filed on Jul. 3, 2016, provisional application No. 62/207,234, filed on Aug. 19, 2015, provisional application No. 62/187,470, filed on Jul. 1, 2015, provisional application No. 62/140,032, filed on Mar. 30, 2015, provisional application No. 62/120,618, filed on Feb. 25, 2015, provisional application No. 62/117,808, filed on Feb. 18, 2015, provisional application No. 62/113,393, filed on Feb. 7, 2015, provisional application No. 62/069,360, filed on Oct. 28, 2014, provisional application No. 62/067,505, filed on Oct. 23, 2014, provisional application No. 62/066,718, filed on Oct. 21, 2014, provisional application No. 62/012,403, filed on Jun. 15, 2014, provisional application No. 61/991,505, filed on May 10, 2014, provisional application No. 61/970,885, filed on Mar. 26, 2014.

(51) Int. Cl.

| | | |
|---|---|---|
| *H04L 67/12* | (2022.01) | |
| *H04L 67/10* | (2022.01) | |
| *G06Q 10/101* | (2023.01) | |
| *E21B 44/00* | (2006.01) | |
| *G06F 3/04842* | (2022.01) | |
| *E21B 47/13* | (2012.01) | |
| *G07F 17/32* | (2006.01) | |
| *E21B 47/18* | (2012.01) | |
| *E21B 49/00* | (2006.01) | |
| *E21B 47/12* | (2012.01) | |
| *E21B 47/00* | (2012.01) | |
| *G01V 13/00* | (2006.01) | |

(52) U.S. Cl.
CPC ......... *E21B 47/18* (2013.01); *G06F 3/04842* (2013.01); *G06Q 10/101* (2013.01); *G06Q 50/01* (2013.01); *G07F 17/3204* (2013.01); *G07F 17/3244* (2013.01); *G07F 17/3272* (2013.01); *G07F 17/3288* (2013.01); *H04L 67/10* (2013.01); *H04L 67/12* (2013.01); *E21B 47/00* (2013.01); *E21B 47/12* (2013.01); *E21B 49/00* (2013.01); *E21B 49/003* (2013.01); *G01V 13/00* (2013.01)

(58) Field of Classification Search
CPC .......... E21B 47/00; E21B 47/12; E21B 49/00; E21B 49/003; G06Q 10/101; G06Q 50/01; H04L 67/10; H04L 67/12; G01V 13/00

See application file for complete search history.

(56) References Cited

U.S. PATENT DOCUMENTS

| | | | |
|---|---|---|---|
| 5,808,908 A | 9/1998 | Ghahramani | |
| 5,867,799 A | 2/1999 | Lang | |
| 6,064,978 A | 5/2000 | Gardner | |
| 6,480,210 B1 | 11/2002 | Martino | |
| 6,606,615 B1* | 8/2003 | Jennings | G06Q 10/06 706/45 |
| 6,792,399 B1* | 9/2004 | Phillips | G06Q 40/04 705/37 |
| 6,903,723 B1* | 6/2005 | Forest | G06F 3/0483 345/157 |
| 6,944,596 B1 | 9/2005 | Gray | |
| 7,031,842 B1 | 4/2006 | Musat | |
| 7,040,982 B1* | 5/2006 | Jarvis | G07F 17/32 463/16 |
| 7,155,510 B1* | 12/2006 | Kaplan | G06Q 40/06 709/227 |
| 7,158,112 B2 | 1/2007 | Rosenberg | |
| 7,451,213 B2* | 11/2008 | Kaplan | G06Q 10/04 709/227 |
| 7,489,979 B2 | 2/2009 | Rosenberg | |
| 7,542,816 B2 | 6/2009 | Rosenberg | |
| 7,562,117 B2 | 7/2009 | Rosenberg | |

(56) References Cited

U.S. PATENT DOCUMENTS

| | | | |
|---|---|---|---|
| 7,603,414 B2 | 10/2009 | Rosenberg | |
| 7,624,077 B2* | 11/2009 | Bonabeau | G06N 3/126 |
| | | | 706/13 |
| 7,653,726 B2* | 1/2010 | Kaplan | G06Q 10/04 |
| | | | 709/227 |
| 7,690,991 B2* | 4/2010 | Black | G06Q 50/34 |
| | | | 463/40 |
| 7,831,928 B1 | 11/2010 | Rose | |
| 7,856,602 B2* | 12/2010 | Armstrong | G06F 3/0482 |
| | | | 715/830 |
| 7,880,741 B2* | 2/2011 | Proebsting | G06T 11/203 |
| | | | 345/442 |
| 7,917,148 B2 | 3/2011 | Rosenberg | |
| 7,937,285 B2* | 5/2011 | Goldberg | H04N 7/17318 |
| | | | 705/7.32 |
| 7,958,006 B2* | 6/2011 | Keil | G06Q 30/0207 |
| | | | 705/14.1 |
| 8,176,101 B2 | 5/2012 | Rosenberg | |
| 8,209,250 B2 | 6/2012 | Bradway | |
| 8,229,824 B2* | 7/2012 | Berg | G06Q 40/04 |
| | | | 705/37 |
| 8,250,071 B1* | 8/2012 | Killalea | G06F 40/30 |
| | | | 707/726 |
| 8,341,065 B2* | 12/2012 | Berg | G06Q 40/04 |
| | | | 705/37 |
| 8,396,777 B1* | 3/2013 | Fine | G06Q 10/04 |
| | | | 705/36 R |
| 8,468,580 B1* | 6/2013 | Casey | G06F 21/606 |
| | | | 726/4 |
| 8,583,470 B1* | 11/2013 | Fine | G06Q 40/04 |
| | | | 705/7.31 |
| 8,589,488 B2 | 11/2013 | Huston | |
| 8,612,331 B2* | 12/2013 | Hanson | G06F 3/04847 |
| | | | 705/37 |
| 8,655,804 B2 | 2/2014 | Carrabis | |
| 8,660,972 B1* | 2/2014 | Heidenreich | G06N 5/00 |
| | | | 706/45 |
| 8,676,735 B1* | 3/2014 | Heidenreich | G06N 5/02 |
| | | | 706/45 |
| 8,745,104 B1 | 6/2014 | Rosenberg | |
| 8,762,435 B1 | 6/2014 | Rosenberg | |
| 8,814,660 B2* | 8/2014 | Thompson | A63F 13/828 |
| | | | 463/25 |
| 9,005,016 B2* | 4/2015 | Amaitis | G07F 17/323 |
| | | | 463/29 |
| 9,483,161 B2 | 11/2016 | Wenger | |
| 9,710,836 B1 | 7/2017 | O'Malley | |
| 9,772,759 B2* | 9/2017 | Hogan | G06F 3/04847 |
| 9,852,239 B2* | 12/2017 | Natarajan | G06F 30/20 |
| 9,940,006 B2 | 4/2018 | Rosenberg | |
| 9,947,174 B2* | 4/2018 | Rangarajan | G07F 17/3244 |
| 9,959,028 B2 | 5/2018 | Rosenberg | |
| 10,110,664 B2 | 10/2018 | Rosenberg | |
| 10,122,775 B2 | 11/2018 | Rosenberg | |
| 10,133,460 B2 | 11/2018 | Rosenberg | |
| 10,222,961 B2 | 3/2019 | Rosenberg | |
| 10,277,645 B2* | 4/2019 | Rosenberg | H04L 67/535 |
| 10,310,802 B2 | 6/2019 | Rosenberg | |
| 10,332,412 B2 | 6/2019 | Swank | |
| 10,353,551 B2* | 7/2019 | Rosenberg | H04L 67/52 |
| 10,410,287 B2* | 9/2019 | Marsh | G06Q 40/00 |
| 10,416,666 B2 | 9/2019 | Rosenberg | |
| 10,439,836 B2 | 10/2019 | Rosenberg | |
| 10,515,516 B1* | 12/2019 | Eckman | G07F 17/3288 |
| 10,551,999 B2 | 2/2020 | Rosenberg | |
| 10,599,315 B2 | 3/2020 | Rosenberg | |
| 10,606,463 B2 | 3/2020 | Rosenberg | |
| 10,606,464 B2 | 3/2020 | Rosenberg | |
| 10,609,124 B2 | 3/2020 | Rosenberg | |
| 10,656,807 B2 | 5/2020 | Rosenberg | |
| 10,712,929 B2 | 7/2020 | Rosenberg | |
| 10,713,303 B2* | 7/2020 | Ashoori | G06F 16/904 |
| 10,817,158 B2 | 10/2020 | Rosenberg | |
| 10,817,159 B2* | 10/2020 | Willcox | |
| 10,902,194 B2* | 1/2021 | Toronto | G06F 40/18 |
| 11,037,400 B2* | 6/2021 | Cohen | G06F 16/9535 |
| 11,151,460 B2 | 10/2021 | Rosenberg | |
| 11,269,502 B2 | 3/2022 | Rosenberg | |
| 11,360,655 B2 | 6/2022 | Willcox | |
| 11,360,656 B2 | 6/2022 | Rosenberg | |
| 2001/0042010 A1 | 11/2001 | Hassell | |
| 2002/0042920 A1 | 4/2002 | Thomas | |
| 2002/0107726 A1 | 8/2002 | Torrance | |
| 2002/0129106 A1 | 9/2002 | Gutfreund | |
| 2002/0152110 A1* | 10/2002 | Stewart | G06Q 30/0203 |
| | | | 705/7.32 |
| 2002/0171690 A1 | 11/2002 | Fox | |
| 2003/0023685 A1 | 1/2003 | Cousins | |
| 2003/0033193 A1* | 2/2003 | Holloway | G06Q 10/10 |
| | | | 715/237 |
| 2003/0065604 A1 | 4/2003 | Gatto | |
| 2003/0079218 A1 | 4/2003 | Goldberg | |
| 2003/0088458 A1 | 5/2003 | Afeyan | |
| 2003/0100357 A1* | 5/2003 | Walker | G07F 17/3262 |
| | | | 463/16 |
| 2003/0119579 A1* | 6/2003 | Walker | G07F 17/3244 |
| | | | 463/20 |
| 2003/0210227 A1* | 11/2003 | Smith | G06F 3/013 |
| | | | 345/157 |
| 2003/0227479 A1* | 12/2003 | Mizrahi | A63F 13/10 |
| | | | 715/753 |
| 2004/0015429 A1* | 1/2004 | Tighe | G06Q 40/04 |
| | | | 705/37 |
| 2004/0064394 A1* | 4/2004 | Wallman | G06Q 40/06 |
| | | | 705/36 R |
| 2004/0210550 A1 | 10/2004 | Williams | |
| 2005/0067493 A1 | 3/2005 | Urken | |
| 2005/0075919 A1 | 4/2005 | Kim | |
| 2005/0168489 A1 | 8/2005 | Ausbeck | |
| 2005/0218601 A1 | 10/2005 | Capellan | |
| 2005/0261953 A1 | 11/2005 | Malek | |
| 2006/0010057 A1* | 1/2006 | Bradway | G06Q 40/00 |
| | | | 705/35 |
| 2006/0147890 A1 | 7/2006 | Bradford | |
| 2006/0200401 A1 | 9/2006 | Lisani | |
| 2006/0204945 A1* | 9/2006 | Masuichi | G09B 7/02 |
| | | | 434/322 |
| 2006/0218179 A1 | 9/2006 | Gardner | |
| 2006/0250357 A1 | 11/2006 | Safai | |
| 2007/0011073 A1 | 1/2007 | Gardner | |
| 2007/0039031 A1 | 2/2007 | Cansler, Jr. | |
| 2007/0055610 A1 | 3/2007 | Palestrant | |
| 2007/0067211 A1 | 3/2007 | Kaplan | |
| 2007/0072156 A1 | 3/2007 | Kaufman | |
| 2007/0073606 A1* | 3/2007 | Lai | G06Q 40/04 |
| | | | 705/37 |
| 2007/0078977 A1* | 4/2007 | Kaplan | G06Q 10/04 |
| | | | 709/224 |
| 2007/0097150 A1 | 5/2007 | Ivashin | |
| 2007/0099162 A1* | 5/2007 | Sekhar | G06Q 10/10 |
| | | | 434/323 |
| 2007/0121843 A1 | 5/2007 | Atazky | |
| 2007/0124503 A1 | 5/2007 | Ramos | |
| 2007/0208727 A1* | 9/2007 | Saklikar | G06F 16/28 |
| 2007/0209069 A1* | 9/2007 | Saklikar | H04W 76/45 |
| | | | 726/14 |
| 2007/0211050 A1 | 9/2007 | Ohta | |
| 2007/0216712 A1* | 9/2007 | Louch | G09G 5/14 |
| | | | 375/E7.076 |
| 2007/0220100 A1 | 9/2007 | Rosenberg | |
| 2007/0226296 A1 | 9/2007 | Lowrance | |
| 2007/0294067 A1 | 12/2007 | West | |
| 2008/0003559 A1* | 1/2008 | Toyama | G09B 7/02 |
| | | | 434/350 |
| 2008/0015115 A1 | 1/2008 | Guyot-Sionnest | |
| 2008/0016463 A1* | 1/2008 | Marsden | G06F 3/011 |
| | | | 345/170 |
| 2008/0091777 A1 | 4/2008 | Carlos | |
| 2008/0103877 A1 | 5/2008 | Gerken | |
| 2008/0140477 A1 | 6/2008 | Tevanian | |
| 2008/0140688 A1* | 6/2008 | Clayton | G06Q 10/0637 |

(56) References Cited

U.S. PATENT DOCUMENTS

| | | |
|---|---|---|
| 2008/0189634 A1 | 8/2008 | Tevanian |
| 2008/0195459 A1 | 8/2008 | Stinski |
| 2009/0037355 A1 | 2/2009 | Brave |
| 2009/0063379 A1* | 3/2009 | Kelly ............... G06Q 10/00 706/46 |
| 2009/0063463 A1 | 3/2009 | Turner |
| 2009/0063991 A1* | 3/2009 | Baron ............. H04L 12/1822 715/751 |
| 2009/0063995 A1 | 3/2009 | Baron |
| 2009/0073174 A1* | 3/2009 | Berg ............... G06T 11/203 345/442 |
| 2009/0076939 A1* | 3/2009 | Berg ............... G06Q 40/04 705/37 |
| 2009/0076974 A1* | 3/2009 | Berg ............... G06Q 40/04 705/36 R |
| 2009/0125821 A1 | 5/2009 | Johnson |
| 2009/0170595 A1* | 7/2009 | Walker ............. G07F 17/322 463/25 |
| 2009/0182624 A1* | 7/2009 | Koen ............... G06Q 40/04 705/37 |
| 2009/0239205 A1* | 9/2009 | Morgia ............. G06Q 10/10 434/362 |
| 2009/0254425 A1 | 10/2009 | Horowitz |
| 2009/0254836 A1 | 10/2009 | Bajrach |
| 2009/0287685 A1 | 11/2009 | Charnock |
| 2009/0325533 A1 | 12/2009 | Lele |
| 2010/0023857 A1 | 1/2010 | Mahesh |
| 2010/0100204 A1 | 4/2010 | Ng |
| 2010/0144426 A1* | 6/2010 | Winner ............. G07F 17/32 463/25 |
| 2010/0145715 A1* | 6/2010 | Cohen ............. G06Q 30/02 705/1.1 |
| 2010/0169144 A1 | 7/2010 | Estill |
| 2010/0174579 A1 | 7/2010 | Hughes |
| 2010/0199191 A1* | 8/2010 | Takahashi .......... G06F 3/0481 715/741 |
| 2010/0205541 A1 | 8/2010 | Rapaport |
| 2010/0299616 A1 | 11/2010 | Chen |
| 2011/0003627 A1* | 1/2011 | Nicely ............. G07F 17/3244 463/20 |
| 2011/0016137 A1 | 1/2011 | Goroshevsky |
| 2011/0080341 A1 | 4/2011 | Helmes |
| 2011/0087687 A1 | 4/2011 | Immaneni |
| 2011/0119048 A1 | 5/2011 | Shaw |
| 2011/0141027 A1 | 6/2011 | Ghassabian |
| 2011/0166916 A1 | 7/2011 | Inbar |
| 2011/0208328 A1 | 8/2011 | Cairns |
| 2011/0208684 A1 | 8/2011 | Dube |
| 2011/0208822 A1 | 8/2011 | Rathod |
| 2011/0276396 A1 | 11/2011 | Rathod |
| 2011/0288919 A1 | 11/2011 | Gross |
| 2011/0320536 A1 | 12/2011 | Lobb |
| 2012/0005131 A1 | 1/2012 | Horvitz |
| 2012/0011006 A1* | 1/2012 | Schultz ............ G06Q 10/10 709/203 |
| 2012/0013489 A1 | 1/2012 | Earl |
| 2012/0072843 A1 | 3/2012 | Durham |
| 2012/0079396 A1 | 3/2012 | Neer |
| 2012/0088220 A1 | 4/2012 | Feng |
| 2012/0088222 A1* | 4/2012 | Considine ......... G09B 5/00 434/362 |
| 2012/0101933 A1* | 4/2012 | Hanson ............ G06F 3/04847 705/37 |
| 2012/0109883 A1 | 5/2012 | Iordanov |
| 2012/0110087 A1 | 5/2012 | Culver |
| 2012/0179567 A1 | 7/2012 | Soroca |
| 2012/0191774 A1* | 7/2012 | Bhaskaran ......... H04H 60/33 709/203 |
| 2012/0290950 A1* | 11/2012 | Rapaport .......... H04L 51/52 715/753 |
| 2012/0316962 A1 | 12/2012 | Rathod |
| 2012/0322540 A1* | 12/2012 | Shechtman ........ G07F 17/3288 463/25 |
| 2013/0013248 A1 | 1/2013 | Brugler |
| 2013/0019205 A1 | 1/2013 | Gil |
| 2013/0035981 A1* | 2/2013 | Brown ............. G06Q 50/01 705/7.29 |
| 2013/0035989 A1 | 2/2013 | Brown |
| 2013/0041720 A1 | 2/2013 | Spires |
| 2013/0097245 A1 | 4/2013 | Adarraga |
| 2013/0103692 A1 | 4/2013 | Raza |
| 2013/0132284 A1 | 5/2013 | Convertino |
| 2013/0160142 A1 | 6/2013 | Lai |
| 2013/0171594 A1 | 7/2013 | Gorman |
| 2013/0184039 A1* | 7/2013 | Steir .............. A63F 13/828 463/1 |
| 2013/0191181 A1* | 7/2013 | Balestrieri ......... G06Q 30/02 705/7.32 |
| 2013/0191390 A1 | 7/2013 | Engel |
| 2013/0203506 A1 | 8/2013 | Brown |
| 2013/0231595 A1 | 9/2013 | Zoss |
| 2013/0254146 A1 | 9/2013 | Ellis |
| 2013/0298690 A1 | 11/2013 | Bond |
| 2013/0300740 A1 | 11/2013 | Snyder |
| 2013/0311904 A1* | 11/2013 | Tien .............. H04L 65/00 715/753 |
| 2013/0317966 A1* | 11/2013 | Bass .............. G06F 3/04847 705/37 |
| 2013/0339445 A1 | 12/2013 | Perincherry |
| 2014/0006042 A1 | 1/2014 | Keefe |
| 2014/0012780 A1 | 1/2014 | Sanders |
| 2014/0047356 A1 | 2/2014 | Ameller-Van-Baumberghen et al. |
| 2014/0057240 A1* | 2/2014 | Colby ............. H04L 12/1822 434/350 |
| 2014/0074751 A1 | 3/2014 | Rocklitz |
| 2014/0075004 A1* | 3/2014 | Van Dusen ........ G06N 5/04 709/223 |
| 2014/0087841 A1* | 3/2014 | Council ........... G07F 17/3244 463/25 |
| 2014/0089233 A1* | 3/2014 | Ellis .............. G07F 17/3223 706/11 |
| 2014/0089521 A1 | 3/2014 | Horowitz |
| 2014/0100924 A1* | 4/2014 | Ingenito ........... G06Q 10/10 705/12 |
| 2014/0108293 A1* | 4/2014 | Barrett ............ G06Q 40/06 705/36 R |
| 2014/0108915 A1 | 4/2014 | Lu |
| 2014/0128162 A1* | 5/2014 | Arafat ............. A63F 13/795 463/42 |
| 2014/0129946 A1 | 5/2014 | Harris |
| 2014/0155142 A1* | 6/2014 | Conroy ............ G07F 17/3288 463/25 |
| 2014/0162241 A1* | 6/2014 | Morgia ............ G06Q 50/10 434/362 |
| 2014/0171039 A1 | 6/2014 | Bjontegard |
| 2014/0214831 A1* | 7/2014 | Chi ............... G06F 16/3329 707/754 |
| 2014/0249689 A1 | 9/2014 | Bienkowski |
| 2014/0249889 A1 | 9/2014 | Park |
| 2014/0258970 A1 | 9/2014 | Brown |
| 2014/0278835 A1* | 9/2014 | Moseson ........... G06Q 50/01 705/12 |
| 2014/0279625 A1* | 9/2014 | Carter ............. G06Q 50/01 705/319 |
| 2014/0282586 A1 | 9/2014 | Shear |
| 2014/0310607 A1 | 10/2014 | Abraham |
| 2014/0316616 A1 | 10/2014 | Kugelmass |
| 2014/0337097 A1 | 11/2014 | Farlie |
| 2014/0351719 A1 | 11/2014 | Cattermole |
| 2014/0358825 A1* | 12/2014 | Phillipps .......... G06N 20/20 706/11 |
| 2014/0379439 A1 | 12/2014 | Sekhar |
| 2015/0006492 A1 | 1/2015 | Wexler |
| 2015/0065214 A1* | 3/2015 | Olson ............. G07F 17/3276 463/9 |
| 2015/0089399 A1* | 3/2015 | Megill ............ H04L 12/1813 715/753 |
| 2015/0120619 A1* | 4/2015 | Baughman ......... G06N 7/01 706/12 |
| 2015/0149932 A1 | 5/2015 | Yamada |

(56) References Cited

U.S. PATENT DOCUMENTS

| | | | |
|---|---|---|---|
| 2015/0154557 A1 | 6/2015 | Skaaksrud | |
| 2015/0156233 A1* | 6/2015 | Bergo | H04M 3/567 715/753 |
| 2015/0170050 A1* | 6/2015 | Price | G06F 16/2477 706/13 |
| 2015/0192437 A1 | 7/2015 | Bouzas | |
| 2015/0236866 A1 | 8/2015 | Colby | |
| 2015/0242755 A1* | 8/2015 | Gross | G06Q 30/0241 706/46 |
| 2015/0242972 A1 | 8/2015 | Lemmey | |
| 2015/0248817 A1 | 9/2015 | Steir | |
| 2015/0262208 A1 | 9/2015 | Bjontegard | |
| 2015/0294527 A1* | 10/2015 | Kolomiiets | G07F 17/3288 463/17 |
| 2015/0302308 A1* | 10/2015 | Bartek | G06Q 10/06 706/46 |
| 2015/0310687 A1* | 10/2015 | Morgia | G07C 13/00 705/12 |
| 2015/0326625 A1 | 11/2015 | Rosenberg | |
| 2015/0331601 A1 | 11/2015 | Rosenberg | |
| 2015/0339020 A1 | 11/2015 | D'Amore | |
| 2015/0347903 A1* | 12/2015 | Saxena | G06T 11/206 706/46 |
| 2015/0378587 A1* | 12/2015 | Falaki | G06F 3/0488 715/747 |
| 2016/0034305 A1* | 2/2016 | Shear | G06F 16/285 707/722 |
| 2016/0044073 A1 | 2/2016 | Rosenberg | |
| 2016/0048274 A1 | 2/2016 | Rosenberg | |
| 2016/0055236 A1* | 2/2016 | Frank | G06F 40/35 707/748 |
| 2016/0057182 A1* | 2/2016 | Rosenberg | G06F 3/0482 715/753 |
| 2016/0062735 A1* | 3/2016 | Wilber | G06F 40/35 708/250 |
| 2016/0078458 A1* | 3/2016 | Gold | G06Q 30/0203 705/7.32 |
| 2016/0082348 A1* | 3/2016 | Kehoe | G06Q 10/101 463/31 |
| 2016/0092989 A1* | 3/2016 | Marsh | G06Q 40/00 705/37 |
| 2016/0098778 A1* | 4/2016 | Blumenthal | G06Q 30/02 705/26.7 |
| 2016/0133095 A1* | 5/2016 | Shraibman | G06Q 50/01 463/18 |
| 2016/0154570 A1 | 6/2016 | Rosenberg | |
| 2016/0170594 A1 | 6/2016 | Rosenberg | |
| 2016/0170616 A1 | 6/2016 | Rosenberg | |
| 2016/0189025 A1 | 6/2016 | Hayes | |
| 2016/0209992 A1 | 7/2016 | Rosenberg | |
| 2016/0210602 A1 | 7/2016 | Siddique | |
| 2016/0274779 A9 | 9/2016 | Rosenberg | |
| 2016/0277457 A9 | 9/2016 | Rosenberg | |
| 2016/0284172 A1 | 9/2016 | Weast | |
| 2016/0314527 A1 | 10/2016 | Rosenberg | |
| 2016/0320956 A9 | 11/2016 | Rosenberg | |
| 2016/0335647 A1* | 11/2016 | Rebrovick | G06Q 30/0203 |
| 2016/0349976 A1* | 12/2016 | Lauer | G06F 3/04847 |
| 2016/0357418 A1 | 12/2016 | Rosenberg | |
| 2016/0366200 A1 | 12/2016 | Healy | |
| 2017/0083974 A1 | 3/2017 | Guillen | |
| 2017/0091633 A1* | 3/2017 | Vemula | G06Q 10/06 |
| 2017/0223411 A1 | 8/2017 | De Juan | |
| 2017/0300198 A1 | 10/2017 | Rosenberg | |
| 2017/0337498 A1* | 11/2017 | Rahimi | G06Q 10/06375 |
| 2018/0076968 A1 | 3/2018 | Rosenberg | |
| 2018/0181117 A1 | 6/2018 | Rosenberg | |
| 2018/0196593 A1 | 7/2018 | Rosenberg | |
| 2018/0203580 A1 | 7/2018 | Rosenberg | |
| 2018/0204184 A1 | 7/2018 | Rosenberg | |
| 2018/0217745 A1 | 8/2018 | Rosenberg | |
| 2018/0239523 A1 | 8/2018 | Rosenberg | |
| 2018/0373991 A1 | 12/2018 | Rosenberg | |
| 2018/0375676 A1 | 12/2018 | Bader-Natal | |
| 2019/0014170 A1 | 1/2019 | Rosenberg | |
| 2019/0034063 A1 | 1/2019 | Rosenberg | |
| 2019/0042081 A1 | 2/2019 | Rosenberg | |
| 2019/0066133 A1* | 2/2019 | Cotton | G06Q 30/0202 |
| 2019/0121529 A1 | 4/2019 | Rosenberg | |
| 2019/0212908 A1 | 7/2019 | Willcox | |
| 2020/0005341 A1* | 1/2020 | Marsh | G06Q 30/0202 |
| 2021/0004149 A1 | 1/2021 | Willcox | |
| 2021/0004150 A1 | 1/2021 | Rosenberg | |
| 2021/0150443 A1* | 5/2021 | Shih | G06N 20/00 |
| 2021/0209554 A1 | 7/2021 | Hill | |
| 2021/0241127 A1 | 8/2021 | Rosenberg | |

FOREIGN PATENT DOCUMENTS

| | | |
|---|---|---|
| EP | 3155584 | 4/2017 |
| EP | 3210386 | 8/2017 |
| GB | 2561458 | 10/2018 |
| JP | 2010191533 | 9/2010 |
| JP | 5293249 | 9/2013 |
| KR | 101273535 | 6/2013 |
| WO | 2011121275 | 10/2011 |
| WO | 2014023432 | 1/2014 |
| WO | 2014190351 | 11/2014 |
| WO | 2015148738 | 10/2015 |
| WO | 2015195492 | 12/2015 |
| WO | 2016064827 | 4/2016 |
| WO | 2017004475 | 1/2017 |
| WO | 2018006065 | 1/2018 |
| WO | 2018094105 | 5/2018 |

OTHER PUBLICATIONS

Atanasov et al.; "Distilling the Wisdom of Crowds: Prediction Markets vs. Prediction Polls"; Managament Science, Articles in Advance; pp. 1-16; http://dx.doi.org/10.1287/mnsc.2015.2374; 2016 INFORMS (Year 2016).

Beni; "From Swarm Intelligence to Swarm Robotics"; Swarm Robotics WS 2004, LNCS 3342; pp. 1-9; 2005.

Combined Search and Examination Report under Sections 17 & 18(3) for GB2202778.3 issued by the GB Intellectual Property Office dated Mar. 10, 2022.

Cuthbertson; "Artificial Intelligence Turns $20 into $11,000 in Kentucky Derby Bet"; Newsweek Tech & Science; http://www.newsweek.com/artificial-intelligence-turns-20-11000-kentucky-derby-bet-457783; May 10, 2016; 9 pages.

Cuthbertson; "Oscar Predictions: AI Calculates Leonardo DiCaprio Will Finally Get His Oscar"; Newsweek Tech & Science; http://www.newsweek.com/oscar-predictions-artificial-intelligence-predicts-leo-will-finally-get-his-430712; Feb. 26, 2016; 3 pages.

Cuthbertson; "Swarm Intelligence: AI Algorithm Predicts the Future"; Newsweek Tech & Science; http://www.newsweek.com/swarm-intelligence-ai-algorithm-predicts-future-418707; Jan. 25, 2016; 4 pages.

Deck et al.; "Prediction Markets in the Laboratory"; University of Arkansas and Chapman University; J. Econ. Surv., 2013; 33 pages.

Deneubourg et al.; "Collective Patterns and Decision-Making"; Ethology Ecology & Evolution; Mar. 22, 1989; pp. 295-311.

Ding et al.; "Time Weight Collaborative Filtering"; CIKM'05, Oct. 31-Nov. 5, 2005; Bremen, Germany; pp. 485-492.

EP; Extended European Search Report for EP Application No. 15767909.3 mailed from the European Patent Office dated Sep. 4, 2017.

EP; Extended European Search Report for EP Application No. 15808982.1 mailed from the European Patent Office dated Nov. 28, 2017.

EP; Extended European Search Report for EP Application No. 15852495.9 mailed from the European Patent Office dated Mar. 21, 2018.

Examination Report for Indian Patent Application No. 201747000968 mailed from the Indian Patent Office dated Nov. 4, 2020.

Examination Report under Section 18(3) for GB1805236.5 mailed from the Intellectual Property Office dated Jul. 30, 2021.

(56) References Cited

OTHER PUBLICATIONS

Examination Report under Section 18(3) for GB1805236.5 mailed from the Intellectual Property Office dated Apr. 1, 2021.
Examination Report under Section 18(3) for GB1805236.5 mailed from the Intellectual Property Office dated Mar. 24, 2022.
Gauchou et al.; "Expression of Nonconscious Knowledge via Ideomotor Actions"; Consciousness and Cognition; Jul. 28, 2011; 9 pages.
Green; "Testing and Quantifying Collective Intelligence"; Collective Intelligence 2015; May 31, 2015; 4 pages.
Gurcay et al.; "The Power of Social Influence on Estimation Accuracy"; Journal of Behavioral Decision Making; J. Behav. Dec. Making (2014); Published online in Wiley Online Library (wileyonlinelibrary.com); DOI:10.1002/bdm.1843; 12 pages (Year: 2014).
Hanson et al.; "Information Aggregation and Manipulation in an Experimental Market"; Interdisciplinary Center for Economic Science, George Mason University; Jul. 12, 2005; 15 pages.
Herkewitz; "Upvotes, Downvotes, and the Science of the Reddit Hivemind"; Aug. 8, 2013; http://www.popularmechanics.com/science/health/a9335/upvotes-downvotes-and-the-scien . . . ; downloaded Mar. 25, 2015; 10 pages.
International Search Report and Written Opinion of the International Searching Authority for PCT/ US2015/022594 dated Jun. 29, 2015.
Malone et al.; "Harnessing Crowds: Mapping the Genome of Collective Intelligence"; MIT Center for Collective Intelligence; Feb. 2009; 20 pages.
Mathematics Libre Texts; "3.3: Power Functions and Polynomial Functions"; Accessed on Oct. 8, 2021 at https://math.libretexts.org/Bookshelves/Precalculus/Precalculus_(OpenStax)/03%3A_Polynomial_and_Rational_Functions/3.03%3A_Power_Functions_and_Polynomial_Functions (Year:2021); 12 pages.
Meyer; "Meet Loomio, The Small-Scale Decision-Making Platform With The Biggest Ambitions"; Mar. 13, 2014; https://gigaom.com/2014/03/13/meet-loomio-the-small-scale-decision-making-platform-wi . . . ; downloaded Mar. 25, 2015; 11 pages.
PCT; International Search Report and Written Opinion of the International Searching Authority for PCT/US2015/035694 dated Aug. 28, 2015.
PCT; International Search Report and Written Opinion of the International Searching Authority for PCT/US2015/56394 dated Feb. 4, 2016.
PCT; International Search Report and Written Opinion of the International Searching Authority for PCT/US2016/040600 dated Nov. 29, 2016.
PCT; International Search Report and Written Opinion of the International Searching Authority for PCT/US2017/040480 dated Oct. 23, 2017.
PCT; International Search Report and Written Opinion of the International Searching Authority for PCT/US2017/062095 dated May 23, 2018.
Puleston et al.; "Predicting the Future: Primary Research Exploring the Science of Prediction"; Copyright Esomar 2014; 31 pages; (Year: 2014).
Quora; "What are Some Open Source Prediction Market Systems?"; retrieved from https://www.quora.com/What-are-some-Open-Source-Prediction-Market-systems; on Mar. 19, 2020 (Year: 2016).
Rand et al.; "Dynamic Social Networks Promote Cooperation in Experiments with Humans"; PNAS; Nov. 29, 2011; vol. 108, No. 48; pp. 19193-19198.
Robertson; "After Success of Mob-Run 'Pokemon', Twitch Bets on Turning Viewers Into 'Torture Artists' Streaming Game Platform Helps Fund 'Choice Chamber', Where the Chat Window Sets the Challenges"; The Verge; Apr. 16, 2014; http://www.theverge.com/2014/4/16/5618334/twitch-streaming-platform-funds-viewer-con . . . ; downloaded Mar. 25, 2015; 4 pages.
Rosenberg et al.; "Amplifying Prediction Accuracy Using Swarm A. I."; Intelligent Systems Conference 2017; Sep. 7, 2017; 5 pages.
Rosenberg et al.; "Crowds vs. Swarms, A Comparison of Intelligence"; IEEE; Oct. 21, 2016; 4 pages.
Rosenberg; U.S. Appl. No. 17/024,580, filed Sep. 17, 2020.
Rosenberg; "Artificial Swarm Intelligence vs. Human Experts"; Neural Networks (IJCNN); 2016 International Joint Conference on IEEE; Jul. 24, 2016; 5 pages.
Rosenberg; "Artificial Swarm Intelligence, a human-in-the-loop approach to A. I."; Association for the Advancement of Artificial Intelligence; Feb. 12, 2016; 2 pages.
Rosenberg; "Human Swarming and The Future of Collective Intelligence"; Singularity WebLog; https://www.singularityweblog.com/human-swarming-and-the-future-of-collective-intelligence/; Jul. 19, 2015; 7 pages.
Rosenberg; "Human Swarming, a real-time method for Parallel Distributed Intelligence"; Proceedings of IEEE, 2015 Swarm/Human Blended Intelligence; Sep. 28, 2015; 7 pages.
Rosenberg; "Human Swarms Amplify Accuracy in Honesty Detection"; Collective Intelligence 2017; Jun. 15, 2017; 5 pages.
Rosenberg; "Human Swarms, a Real-Time Method for Collective Intelligence"; Proceedings of the European Conference on Artificial Life 2015; Jul. 20, 2015; pp. 658-659.
Rosenberg; "Monkey Room Book One"; Outland Pictures; Amazon ebook; Jan. 15, 2014; 39 pages.
Rosenberg; "Monkey Room Book Three"; Outland Pictures; Amazon ebook; Feb. 20, 2014; 22 pages.
Rosenberg; "Monkey Room Book Two"; Outland Pictures; Amazon ebook; Feb. 9, 2014; 27 pages.
Rosenberg; "Monkey Room"; Outland Pictures; Amazon; Mar. 30, 2014; 110 pages.
Rosenberg; "New Hope for Humans in an A. I. World"; TEDxKC—You Tube; Sep. 7, 2017; http://www.youtube.com/watch?v=EuRyZT_Uas.
Rosenberg; U.S. Appl. No. 14/668,970, filed Mar. 25, 2015.
Rosenberg; U.S. Appl. No. 14/708,038, filed May 8, 2015.
Rosenberg; U.S. Appl. No. 14/738,768, filed Jun. 12, 2015.
Rosenberg; U.S. Appl. No. 14/859,035, filed Sep. 18, 2015.
Rosenberg; U.S. Appl. No. 14/920,819, filed Oct. 22, 2015.
Rosenberg; U.S. Appl. No. 14/925,837, filed Oct. 28, 2015.
Rosenberg; U.S. Appl. No. 15/017,424, filed Feb. 5, 2016.
Rosenberg; U.S. Appl. No. 15/047,522, filed Feb. 18, 2016.
Rosenberg; U.S. Appl. No. 15/052,876, filed Feb. 25, 2016.
Rosenberg; U.S. Appl. No. 15/086,034, filed Mar. 30, 2016.
Rosenberg; U.S. Appl. No. 15/199,990, filed Jul. 1, 2016.
Rosenberg; U.S. Appl. No. 15/241,340, filed Aug. 19, 2016.
Rosenberg; U.S. Appl. No. 15/640,145, filed Jun. 30, 2017.
Rosenberg; U.S. Appl. No. 15/898,468, filed Feb. 17, 2018.
Rosenberg; U.S. Appl. No. 15/904,239, filed Feb. 23, 2018.
Rosenberg; U.S. Appl. No. 15/910,934, filed Mar. 2, 2018.
Rosenberg; U.S. Appl. No. 15/922,453, filed Mar. 15, 2018.
Rosenberg; U.S. Appl. No. 15/936,324, filed Mar. 26, 2018.
Rosenberg; U.S. Appl. No. 16/059,698, filed Aug. 9, 2018.
Rosenberg; U.S. Appl. No. 16/154,613, filed Oct. 8, 2018.
Rosenberg; U.S. Appl. No. 17/581,769, filed Jan. 21, 2022.
Rosenberg; U.S. Appl. No. 17/744,464, filed May 13, 2022.
Rosenberg: U.S. Appl. No. 15/959,080, filed Apr. 20, 2018.
Salminen; "Collective Intelligence in Humans: A Literature Review"; Lappeenranta University of Technology, Lahti School of Innovation; 1Proceedings; 2012; 8 pages.
Search and Examination Report under Sections 17 & 18(3) for Application No. GB1805236.5 issued by the UK Intellectual Property Office dated Jan. 28, 2022.
Search Report under Section 17 for GB2202778.3 issued by the GB Intellectual Property Office dated Mar. 4, 2022.
Souppouris; "Playing 'Pokemon' with 78,000 People is Frustratingly Fun"; The Verge; Feb. 17, 2014; http://www.theverge.com/2014/2/17/5418690/play-this-twitch-plays-pokemon-crowdsource . . . ; downloaded Mar. 25, 2015; 3 pages.
Stafford; "How the Ouija Board Really Moves"; BBC Future; Jul. 30, 2013; http://www.bbc.com/future/story/20130729-what-makes-the-ouija-board-move; downloaded Mar. 25, 2015; 5 pages.
Surowiecki; "The Wisdom of Crowds—Why the Many Are Smarter Than the Few and How Collective Wisdom Shapes Business, Economies, Societies, and Nations"; Business Book Review; vol. 21, No. 43; 2006; 10 pages.

(56) References Cited

OTHER PUBLICATIONS

Transforming Relationships; "Lottery: A tax on the statistically-challenged."; Chapter 4, Sec 4.1; Accessed on Oct. 8, 2021 at http://www.henry.k12.ga.us/ugh/apstat/chaptemotes/sec4.1.html (Year:2021); 3 pages.
Unanimous A. I.; "What is Swarm Intelligence"; 2015; http://unu.ai/swarm-intelligence/; downloaded Oct. 6, 2016; 3 pages.
USPTO; Non-Final Office Action for U.S. Appl. No. 17/024,474 dated Oct. 12, 2021.
USPTO; Examiner Interview Summary for U.S. Appl. No. 15/086,034 dated Feb. 13, 2019.
USPTO; Examiner Interview Summary for U.S. Appl. No. 15/086,034 dated Jan. 9, 2019.
USPTO; Examiner Interview Summary for U.S. Appl. No. 16/059,698 dated Feb. 2, 2021.
USPTO; Final Office Action for U.S. Appl. No. 14/925,837 dated Aug. 7, 2019.
USPTO; Final Office Action for U.S. Appl. No. 15/086,034 dated Jul. 17, 2018.
USPTO; Final Office Action for U.S. Appl. No. 16/059,698 dated Dec. 31, 2020.
USPTO; Non-Final Office Action for U.S. Appl. No. 14/738,768 dated Sep. 8, 2017.
USPTO; Non-Final Office Action for U.S. Appl. No. 17/024,580 dated Nov. 23, 2021.
USPTO; Non-Final Office Action for U.S. Appl. No. 15/047,522 dated Jan. 5, 2018.
USPTO; Non-Final Office Action for U.S. Appl. No. 14/708,038 dated Feb. 15, 2018.
USPTO; Non-Final Office Action for U.S. Appl. No. 14/859,035 dated Feb. 12, 2018.
USPTO; Non-Final Office Action for U.S. Appl. No. 14/920,819 dated Jun. 27, 2018.
USPTO; Non-Final Office Action for U.S. Appl. No. 14/925,837 dated Apr. 3, 2018.
USPTO; Non-Final Office Action for U.S. Appl. No. 15/017,424 dated Apr. 2, 2019.
USPTO; Non-Final Office Action for U.S. Appl. No. 15/052,876 dated Feb. 22, 2018.
USPTO; Non-Final Office Action for U.S. Appl. No. 15/086,034 dated Feb. 2, 2018.
USPTO; Non-Final Office Action for U.S. Appl. No. 15/199,990 dated Sep. 25, 2019.
USPTO; Non-Final Office Action for U.S. Appl. No. 15/241,340 dated Jul. 19, 2018.
USPTO; Non-Final Office Action for U.S. Appl. No. 15/898,468 dated Mar. 3, 2020.
USPTO; Non-Final Office Action for U.S. Appl. No. 15/910,934 dated Oct. 16, 2019.
USPTO; Non-Final Office Action for U.S. Appl. No. 15/922,453 dated Dec. 23, 2019.
USPTO; Non-Final Office Action for U.S. Appl. No. 15/936,324 dated Oct. 21, 2019.
USPTO; Non-Final Office Action for U.S. Appl. No. 15/959,080 dated Nov. 7, 2019.
USPTO; Non-Final Office Action for U.S. Appl. No. 16/059,698 dated Jun. 8, 2020.
USPTO; Non-Final Office Action for U.S. Appl. No. 16/130,990 dated Oct. 21, 2019.
USPTO; Non-Final Office Action for U.S. Appl. No. 16/147,647 dated Jan. 27, 2020.
USPTO; Non-Final Office Action for U.S. Appl. No. 16/154,613 dated Aug. 20, 2021.
USPTO; Non-Final Office Action for U.S. Appl. No. 16/230,759 dated Mar. 26, 2020.
USPTO; Non-Final Office Action for U.S. Appl. No. 16/668,970 dated Aug. 15, 2017.
USPTO; Notice of Allowance for U.S. Appl. No. 16/154,613 dated Nov. 3, 2021.
USPTO; Notice of Allowance for U.S. Appl. No. 16/130,990 dated Jan. 21, 2020.
USPTO; Notice of Allowance for U.S. Appl. No. 14/668,970 dated Feb. 8, 2018.
USPTO; Notice of Allowance for U.S. Appl. No. 14/738,768 dated Feb. 2, 2018.
USPTO; Notice of Allowance for U.S. Appl. No. 14/859,035 dated Aug. 23, 2018.
USPTO; Notice of Allowance for U.S. Appl. No. 14/920,819 dated Dec. 27, 2018.
USPTO; Notice of Allowance for U.S. Appl. No. 14/925,837 dated Nov. 7, 2019.
USPTO; Notice of Allowance for U.S. Appl. No. 15/959,080 dated Jan. 31, 2020.
USPTO; Notice of Allowance for U.S. Appl. No. 15/047,522 dated Aug. 30, 2018.
USPTO; Notice of Allowance for U.S. Appl. No. 15/052,876 dated Aug. 13, 2018.
USPTO; Notice of Allowance for U.S. Appl. No. 15/086,034 dated Mar. 5, 2019.
USPTO; Notice of Allowance for U.S. Appl. No. 15/241,340 dated Nov. 20, 2018.
USPTO; Notice of Allowance for U.S. Appl. No. 15/640,145 dated May 23, 2019.
USPTO; Notice of Allowance for U.S. Appl. No. 15/640,145 dated Nov. 15, 2018.
USPTO; Notice of Allowance for U.S. Appl. No. 15/815,579 dated Jul. 31, 2019.
USPTO; Notice of Allowance for U.S. Appl. No. 15/898,468 dated May 1, 2020.
USPTO; Notice of Allowance for U.S. Appl. No. 15/910,934 dated Jan. 15, 2020.
USPTO; Notice of Allowance for U.S. Appl. No. 15/936,324 dated Dec. 9, 2019.
USPTO; Notice of Allowance for U.S. Appl. No. 16/059,698 dated Mar. 15, 2021.
USPTO; Notice of Allowance for U.S. Appl. No. 16/147,647 dated Mar. 18, 2020.
USPTO; Notice of Allowance for U.S. Appl. No. 16/230,759 dated Jul. 17, 2020.
USPTO; Notice of Allowance for U.S. Appl. No. 16/356,777 dated Jul. 22, 2020.
USPTO; Notice of Allowance for U.S. Appl. No. 16/904,239 dated Jun. 17, 2019.
USPTO; Notice of Allowance for U.S. Appl. No. 17/024,580 dated Apr. 12, 2022.
USPTO; Office Action for U.S. Appl. No. 14/708,038 dated Apr. 23, 2019.
USPTO; Restriction Requirement for U.S. Appl. No. 15/017,424 dated Oct. 2, 2018.
USPTO; Restriction Requirement for U.S. Appl. No. 15/199,990 dated Aug. 1, 2019.
USPTO: Notice of Allowance issued in U.S. Appl. No. 17/024,474 dated Apr. 11, 2022.
Wikipedia; "Swarm (simulation)"; Jul. 22, 2016; http://en.wikipedia.org/wiki/Swarm_(simulation); downloaded Oct. 6, 2016; 2 pages.
Wikipedia; "Swarm intelligence"; Aug. 31, 2016; http://en.wikipedia.org/wiki/Swarm_intelligence; downloaded Oct. 6, 2016; 8 pages.
Willcox; U.S. Appl. No. 16/356,777, filed Mar. 18, 2019.
Willcox; U.S. Appl. No. 17/024,474, filed Sep. 17, 2020.
Yeung et al.; "Metacognition in human decision-making: confidence and error monitoring"; Philosophical Transactions of the Royal Society B; 2012; pp. 1310-1321.

\* cited by examiner

SYSTEM AND METHOD FOR ENHANCED COLLABORATIVE FORECASTING

This application is a continuation of U.S. application Ser. No. 17/024,474 entitled SYSTEM AND METHOD OF NON-LINEAR PROBABILISTIC FORECASTING TO FOSTER AMPLIFIED COLLECTIVE INTELLIGENCE OF NETWORKED HUMAN GROUPS filed Sep. 17, 2020, which is a continuation of U.S. application Ser. No. 16/356,777 entitled NON-LINEAR PROBABILISTIC WAGERING FOR AMPLIFIED COLLECTIVE INTELLIGENCE filed Mar. 18, 2019, now U.S. Pat. No. 10,817,159, which claims the benefit of U.S. Provisional Application No. 62/648,424 entitled NON-LINEAR PROBABILISTIC WAGERING FOR AMPLIFIED COLLECTIVE INTELLIGENCE filed Mar. 27, 2018, which is a continuation-in-part of U.S. application Ser. No. 16/230,759 entitled METHOD AND SYSTEM FOR A PARALLEL DISTRIBUTED HYPER-SWARM FOR AMPLIFYING HUMAN INTELLIGENCE, filed Dec. 21, 2018, now U.S. Pat. No. 10,817,158, claiming the benefit of U.S. Provisional Application No. 62/611,756 entitled METHOD AND SYSTEM FOR A PARALLEL DISTRIBUTED HYPER-SWARM FOR AMPLIFYING HUMAN INTELLIGENCE, filed Dec. 29, 2017, which is a continuation-in-part of U.S. application Ser. No. 16/154,613 entitled INTERACTIVE BEHAVIORAL POLLING AND MACHINE LEARNING FOR AMPLIFICATION OF GROUP INTELLIGENCE, filed Oct. 8, 2018, now U.S. Pat. No. 11,269,502, claiming the benefit of U.S. Provisional Application No. 62/569,909 entitled INTERACTIVE BEHAVIORAL POLLING AND MACHINE LEARNING FOR AMPLIFICATION OF GROUP INTELLIGENCE, filed Oct. 9, 2017, which is a continuation-in-part of U.S. application Ser. No. 16/059,698 entitled ADAPTIVE POPULATION OPTIMIZATION FOR AMPLIFYING THE INTELLIGENCE OF CROWDS AND SWARMS, filed Aug. 9, 2018, now U.S. Pat. No. 11,151,460, claiming the benefit of U.S. Provisional Application No. 62/544,861, entitled ADAPTIVE OUTLIER ANALYSIS FOR AMPLIFYING THE INTELLIGENCE OF CROWDS AND SWARMS, filed Aug. 13, 2017 and of U.S. Provisional Application No. 62/552,968 entitled SYSTEM AND METHOD FOR OPTIMIZING THE POPULATION USED BY CROWDS AND SWARMS FOR AMPLIFIED EMERGENT INTELLIGENCE, filed Aug. 31, 2017, which is a continuation-in-part of U.S. application Ser. No. 15/922,453 entitled PARALLELIZED SUB-FACTOR AGGREGATION IN REAL-TIME SWARM-BASED COLLECTIVE INTELLIGENCE SYSTEMS, filed Mar. 15, 2018, claiming the benefit of U.S. Provisional Application No. 62/473,424 entitled PARALLELIZED SUB-FACTOR AGGREGATION IN A REAL-TIME COLLABORATIVE INTELLIGENCE SYSTEMS filed Mar. 19, 2017, which in turn is a continuation-in-part of U.S. application Ser. No. 15/904,239 entitled METHODS AND SYSTEMS FOR COLLABORATIVE CONTROL OF A REMOTE VEHICLE, filed Feb. 23, 2018, now U.S. Pat. No. 10,416,666, claiming the benefit of U.S. Provisional Application No. 62/463,657 entitled METHODS AND SYSTEMS FOR COLLABORATIVE CONTROL OF A ROBOTIC MOBILE FIRST-PERSON STREAMING CAMERA SOURCE, filed Feb. 26, 2017 and also claiming the benefit of U.S. Provisional Application No. 62/473,429 entitled METHODS AND SYSTEMS FOR COLLABORATIVE CONTROL OF A ROBOTIC MOBILE FIRST-PERSON STREAMING CAMERA SOURCE, filed Mar. 19, 2017, which is a continuation-in-part of U.S. application Ser. No. 15/898,468 entitled ADAPTIVE CONFIDENCE CALIBRATION FOR REAL-TIME SWARM INTELLIGENCE SYSTEMS, filed Feb. 17, 2018, now U.S. Pat. No. 10,712,929, claiming the benefit of U.S. Provisional Application No. 62/460,861 entitled ARTIFICIAL SWARM INTELLIGENCE WITH ADAPTIVE CONFIDENCE CALIBRATION, filed Feb. 19, 2017 and also claiming the benefit of U.S. Provisional Application No. 62/473,442 entitled ARTIFICIAL SWARM INTELLIGENCE WITH ADAPTIVE CONFIDENCE CALIBRATION, filed Mar. 19, 2017, which is a continuation-in-part of U.S. application Ser. No. 15/815,579 entitled SYSTEMS AND METHODS FOR HYBRID SWARM INTELLIGENCE, filed Nov. 16, 2017, now U.S. Pat. No. 10,439,836, claiming the benefit of U.S. Provisional Application No. 62/423,402 entitled SYSTEM AND METHOD FOR HYBRID SWARM INTELLIGENCE filed Nov. 17, 2016, which is a continuation-in-part of U.S. application Ser. No. 15/640,145 entitled METHODS AND SYSTEMS FOR MODIFYING USER INFLUENCE DURING A COLLABORATIVE SESSION OF REAL-TIME COLLABORATIVE INTELLIGENCE, filed Jun. 30, 2017, now U.S. Pat. No. 10,353,551, claiming the benefit of U.S. Provisional Application No. 62/358,026 entitled METHODS AND SYSTEMS FOR AMPLIFYING THE INTELLIGENCE OF A HUMAN-BASED ARTIFICIAL SWARM INTELLIGENCE filed Jul. 3, 2016, which is a continuation-in-part of U.S. application Ser. No. 15/241,340 entitled METHODS FOR ANALYZING DECISIONS MADE BY REAL-TIME COLLECTIVE INTELLIGENCE SYSTEMS, filed Aug. 19, 2016, now U.S. Pat. No. 10,222,961, claiming the benefit of U.S. Provisional Application No. 62/207,234 entitled METHODS FOR ANALYZING THE DECISIONS MADE BY REAL-TIME COLLECTIVE INTELLIGENCE SYSTEMS filed Aug. 19, 2015, which is a continuation-in-part of U.S. application Ser. No. 15/199,990 entitled METHODS AND SYSTEMS FOR ENABLING A CREDIT ECONOMY IN A REAL-TIME COLLABORATIVE INTELLIGENCE, filed Jul. 1, 2016, claiming the benefit of U.S. Provisional Application No. 62/187,470 entitled METHODS AND SYSTEMS FOR ENABLING A CREDIT ECONOMY IN A REAL-TIME SYNCHRONOUS COLLABORATIVE SYSTEM filed Jul. 1, 2015, which is a continuation-in-part of U.S. application Ser. No. 15/086,034 entitled SYSTEM AND METHOD FOR MODERATING REAL-TIME CLOSED-LOOP COLLABORATIVE DECISIONS ON MOBILE DEVICES, filed Mar. 30, 2016, now U.S. Pat. No. 10,310,802, claiming the benefit of U.S. Provisional Application No. 62/140,032 entitled SYSTEM AND METHOD FOR MODERATING A REAL-TIME CLOSED-LOOP COLLABORATIVE APPROVAL FROM A GROUP OF MOBILE USERS filed Mar. 30, 2015, which is a continuation-in-part of U.S. patent application Ser. No. 15/052,876, filed Feb. 25, 2016, entitled DYNAMIC SYSTEMS FOR OPTIMIZATION OF REAL-TIME COLLABORATIVE INTELLIGENCE, now U.S. Pat. No. 10,110,664, claiming the benefit of U.S. Provisional Application No. 62/120,618 entitled APPLICATION OF DYNAMIC RESTORING FORCES TO OPTIMIZE GROUP INTELLIGENCE IN REAL-TIME SOCIAL SWARMS, filed Feb. 25, 2015, which is a continuation-in-part of U.S. application Ser. No. 15/047,522 entitled SYSTEMS AND METHODS FOR COLLABORATIVE SYNCHRONOUS IMAGE SELECTION, filed Feb. 18, 2016, now U.S. Pat. No. 10,133,460, which in turn claims the benefit of U.S. Provisional Application No. 62/117,808 entitled SYSTEM AND METHODS FOR COLLABORATIVE SYNCHRONOUS IMAGE SELECTION, filed Feb. 18, 2015, which is a continuation-in-part of U.S. application Ser. No. 15/017,424 entitled ITERATIVE SUGGESTION MODES FOR REAL-TIME COLLABORATIVE INTELLIGENCE SYSTEMS, filed Feb. 5, 2016 which in turn claims the benefit of U.S. Provisional Application No. 62/113,393 entitled SYSTEMS AND METHODS FOR ENABLING SYNCHRONOUS COLLABORATIVE CREATIVITY AND DECISION MAKING, filed Feb. 7, 2015, which is a continuation-in-part of U.S. application Ser. No. 14/925,837 entitled MULTI-PHASE MULTI-GROUP SELECTION METHODS FOR REAL-TIME COLLABORATIVE INTELLIGENCE SYSTEMS, filed Oct. 28, 2015, now U.S. Pat. No. 10,551,999, which in turn claims the benefit of U.S. Provisional Application No. 62/069,360 entitled SYSTEMS AND METHODS FOR ENABLING AND MODERATING A MASSIVELY-PARALLEL REAL-TIME SYNCHRONOUS COLLABORATIVE SUPER-INTELLIGENCE, filed Oct. 28, 2014, which is a continuation-in-part of U.S. application Ser. No. 14/920,819 entitled SUGGESTION AND BACKGROUND MODES FOR REAL-TIME COLLABORATIVE INTELLIGENCE SYSTEMS, filed Oct. 22, 2015, now U.S. Pat. No. 10,277,645, which in turn claims the benefit of U.S. Provisional Application No. 62/067,505 entitled SYSTEM AND METHODS FOR MODERATING REAL-TIME COLLABORATIVE DECISIONS OVER A DISTRIBUTED NETWORKS, filed Oct. 23, 2014, which is a continuation-in-part of U.S. application Ser. No. 14/859,035 entitled SYSTEMS AND METHODS FOR ASSESSMENT AND OPTIMIZATION OF REAL-TIME COLLABORATIVE INTELLIGENCE SYSTEMS, filed Sep. 18, 2015, now U.S. Pat. No. 10,122,775, which in turns claims the benefit of U.S. Provisional Application No. 62/066,718 entitled SYSTEM AND METHOD FOR MODERATING AND OPTIMIZING REAL-TIME SWARM INTELLIGENCES, filed Oct. 21, 2014, which is a continuation-in-part of U.S. patent application Ser. No. 14/738,768 entitled INTUITIVE INTERFACES FOR REAL-TIME COLLABORATIVE INTELLIGENCE, filed Jun. 12, 2015, now U.S. Pat. No. 9,940,006, which in turn claims the benefit of U.S. Provisional Application 62/012,403 entitled INTUITIVE INTERFACE FOR REAL-TIME COLLABORATIVE CONTROL, filed Jun. 15, 2014, which is a continuation-in-part of U.S. application Ser. No. 14/708,038 entitled MULTI-GROUP METHODS AND SYSTEMS FOR REAL-TIME MULTI-TIER COLLABORATIVE INTELLIGENCE, filed May 8, 2015, which in turn claims the benefit of U.S. Provisional Application 61/991,505 entitled METHODS AND SYSTEM FOR MULTI-TIER COLLABORATIVE INTELLIGENCE, filed May 10, 2014, which is a continuation-in-part of U.S. patent application Ser. No. 14/668,970 entitled METHODS AND SYSTEMS FOR REAL-TIME COLLABORATIVE INTELLIGENCE, filed Mar. 25, 2015, now U.S. Pat. No. 9,959,028, which in turn claims the benefit of U.S. Provisional Application 61/970,885 entitled METHOD AND SYSTEM FOR ENABLING A GROUPWISE COLLABORATIVE CONSCIOUSNESS, filed Mar. 26, 2014, all of which are incorporated in their entirety herein by reference.

BACKGROUND OF THE INVENTION

1. Field of the Invention

The present invention relates generally to systems and methods for collective intelligence, and more specifically to systems and methods for enabling users to provide consistent assessments.

2. Discussion of the Related Art

When capturing the insights from the members of a population it is often important to record not just their expressed sentiment, but also the strength of their sentiment, whether it be their level of confidence in a predicted outcome or their level of conviction in an expressed point of view. For example, when asking the members of a population to make forecasts about future events, it is often valuable to record not just their forecasted outcome, but their confidence in that forecasted outcome.

Soliciting honest expressions of confidence is particularly important when aggregating sentiment across a population, as some members may harbor a sentiment with only slight confidence, while other members may harbor very strong confidence. In such situations, it is sometimes desirable to aggregate sentiments across uses such that they are weighted by expressed confidence (or conviction) of each member.

The question remains—how can we best capture confidence or conviction levels from participants?

In the past we have used various methods to address this need. For example, we have required participants to assign numerical probabilities (0% to 100%) that reflect their expected likelihood of an outcome. Alternatively, we have required participants to place wagers on outcomes, the level of their wagers reflecting their confidence or conviction. Whatever the method we choose, the objective is—to get participants to (a) report their confidence (or conviction) as accurately as they can, and (b) do so using a numerical scale that is highly consistent from person to person.

Unfortunately, current methods often perform poorly on both fronts. That's because human participants have been shown to be inaccurate at reporting their internal confidence (or conviction) on numerical scales. This is true when asked to express confidence as percentages or wagers.

In addition, current methods are often inconsistent from person to person. For example, when asking participants to predict which team will win a sporting event—Team A or Team B, along with a confidence value, is difficult to get accurate and consistent confidence values. Why is it so difficult to get accurate and consistent confidence values? The problems faced include:

(a) Participants need to be motivated to give an accurate assessment of their personal confidence in a prediction they have expressed. If they are not sufficiently motivated, they will not thoughtfully consider their feelings.

(b) Participants need to express their confidence in an authentic manner that evokes a genuine visceral feeling of confidence vs uncertainty rather than being asked to report a value on an abstract psychometric scale (like a number from 1 to 10, or a percentage from 0 to 100.) Prior research shows that abstract psychometric scales generate results which are highly variable from participant to participant, while authentic expressions are superior.

One approach that aims to motivate participants in an authentic manner, is to ask participants to place a wager upon their chosen outcome. For example, if they predict Team A will win, we can then ask how much they would bet on that outcome. If they stand to benefit from a correct prediction in proportion to their wager, they may express confidence in an authentic manner.

We have used this method in the past, through a value we call "Dollar Confidence". While our results for Dollar Confidence have enabled amplification of intelligence, analysis shows that this value is not ideal. The fact is, people are inconsistent when asked to place wagers, as personality differences cause some individuals to be risk adverse, and other individuals to be risk tolerant.

So, how can we drive participants to give authentic, accurate, and consistent expressions of confidence when making forecasts? An innovative solution is needed that provides participants with a new form of wagering, that forces them to think probabilistically and reduces the differences between risk adverse and risk tolerant personalities.

SUMMARY OF THE INVENTION

Several embodiments of the invention advantageously address the needs above as well as other needs by providing an interactive system for eliciting from a user a probabilistic indication of the likelihood of each of two possible outcomes of a future event, the interactive system comprising: a processor connected to graphical display and a user interface; a graphical user interface presented upon the graphical display and including a user manipulatable wager marker that can be moved by the user across a range of positions between a first limit and a second limit, wherein the first limit is associated with a first outcome of the two possible outcomes and the second limit is associated with a second outcome of the two possible outcomes; a first reward value presented on the graphical display and visually associated with the first outcome, the first reward value interactively responsive to the position of the user manipulatable wager marker; a second reward value presented on the graphical display and visually associated with the second outcome, the second reward value interactively responsive to the position of the user manipulatable wager marker; a first software routine configured to run on the processor, the first software routine configured to repeatedly update both the first and second reward values in response to user manipulation of the wager marker, the first software routine using a non-linear model for updating the first and second reward values in response to linear manipulation of the wager marker, the non-linear model following a monotonic power function that is implemented such that a non-linear increase in the first reward value corresponds to a non-linear decrease of the second reward value, and a non-linear increase in the second reward value corresponds to a non-linear decrease in the first reward value; a second software routine configured to run on the processor and determine a final first reward value and a final second reward value based upon a final position of the wager marker; and a third software routine configured to run on the processor and generate a forecast probability value associated with each of the two possible outcomes based upon the final position of the wager marker between the two limits, the forecast probability value being a linear function of the position of the wager marker.

BRIEF DESCRIPTION OF THE DRAWINGS

The above and other aspects, features and advantages of several embodiments of the present invention will be more apparent from the following more particular description thereof, presented in conjunction with the following drawings.

Figure 1:
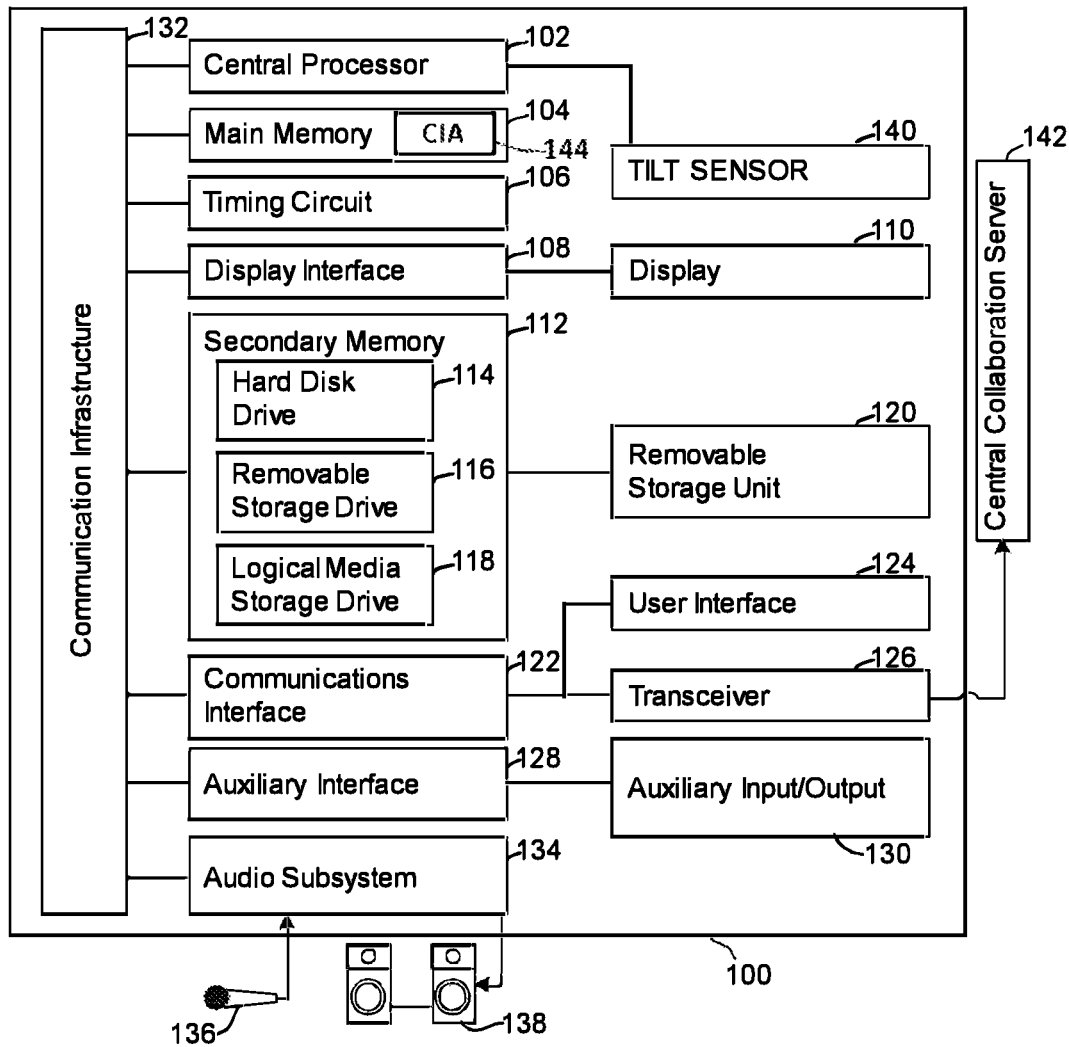
FIG. 1 is a schematic diagram of an exemplary computing device configured for use in a collaboration system.
Figure 2:
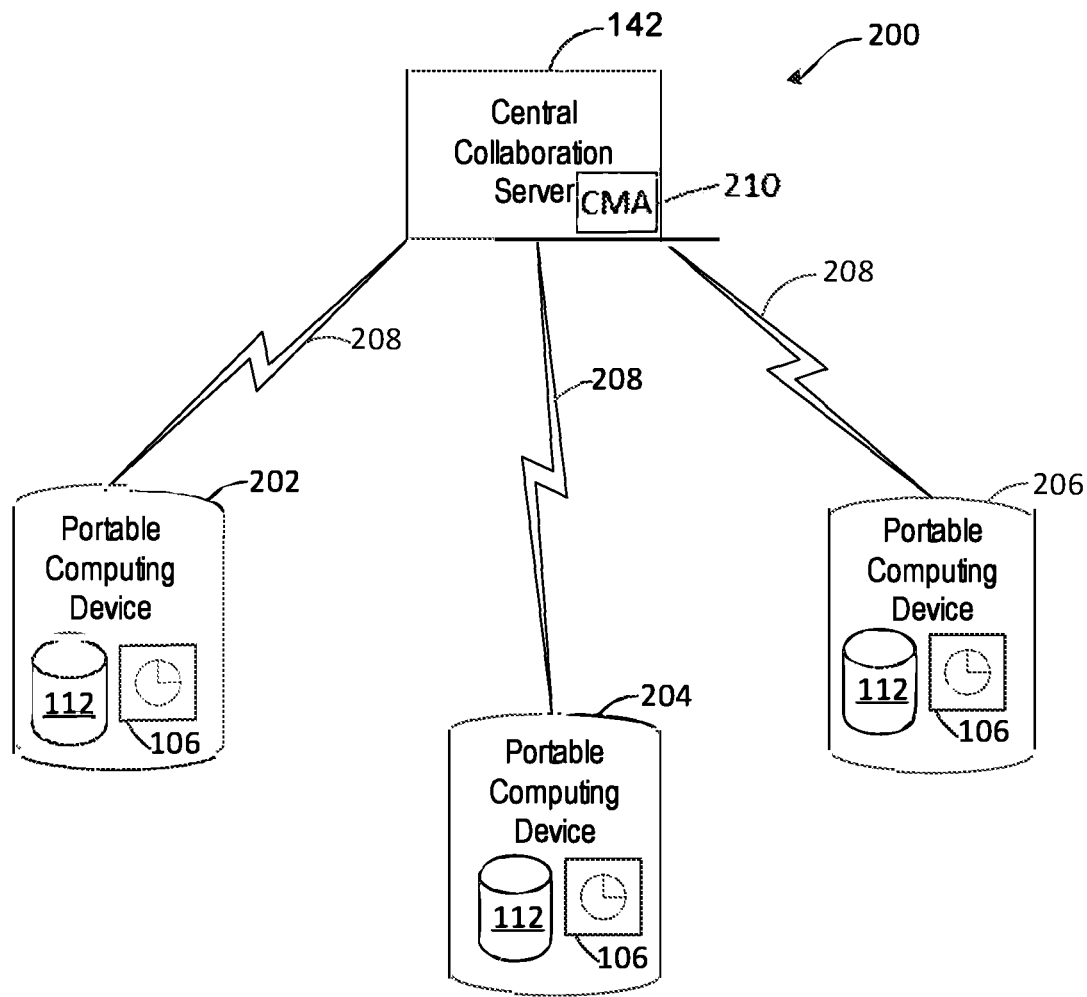
FIG. 2 is a schematic diagram of an exemplary real-time collaboration system.
Figure 3:
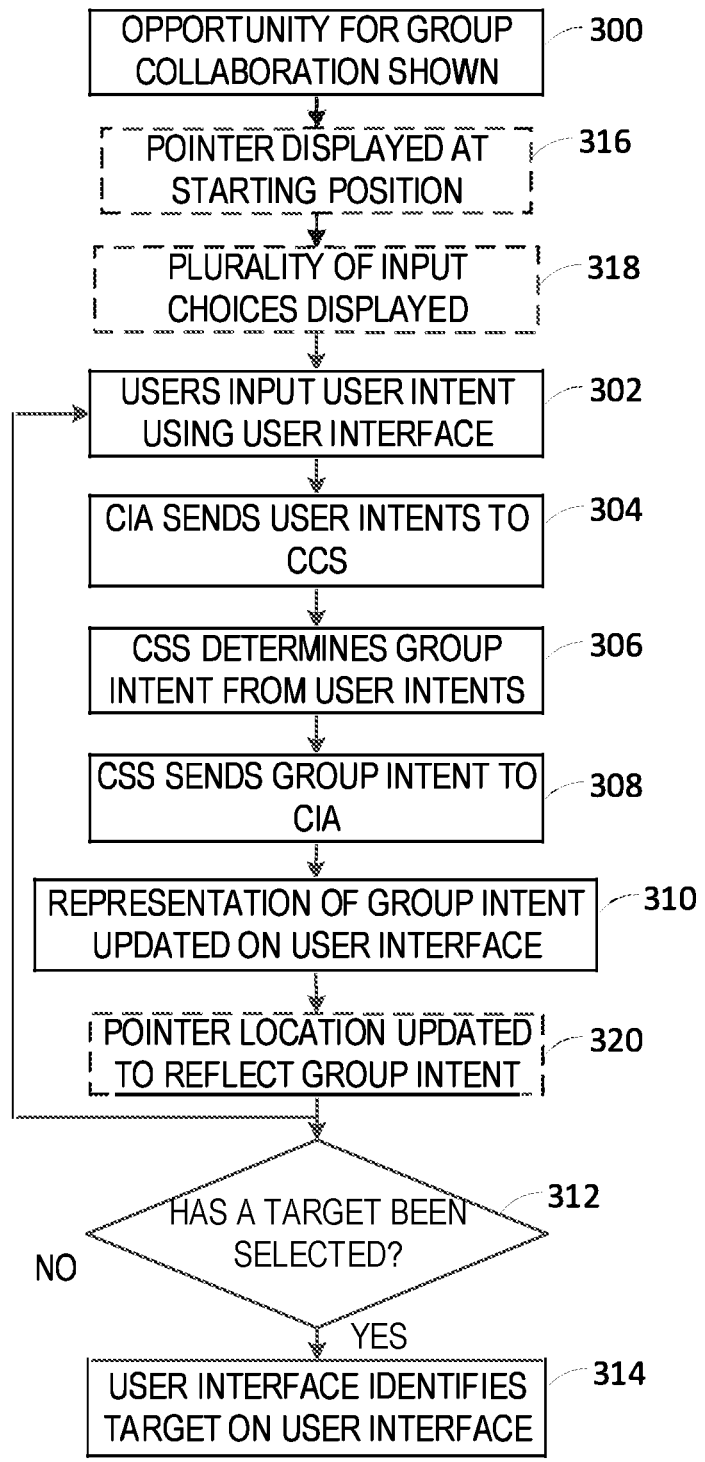
FIG. 3 is a flowchart of an exemplary group collaboration process using the collaboration system.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Real-time occurrences as referenced herein are those that are substantially current within the context of human perception and reaction.

As referred to in this specification, "media items" refers to video, audio, streaming and any combination thereof. In addition, the audio subsystem is envisioned to optionally include features such as graphic equalization, volume, balance, fading, base and treble controls, surround sound emulation, and noise reduction. One skilled in the relevant art will appreciate that the above cited list of file formats is not intended to be all inclusive.

Historical research demonstrates that the insights generated by groups can be more accurate than the insights generated by individuals in many situations. A classic example is estimating the number of beans in a jar. Many researchers have shown that taking the statistical average of estimates made by many individuals will yield an answer that is more accurate than the typical member of the population queried. When the individuals provide their input as isolated data points, to be aggregated statistically, the process is often referred to as "crowdsourcing". When the individuals form a real-time system and provide their input together, with feedback loops enabling the group to converge on a solution in synchrony, the process is often referred to as "swarming". While very different entities, crowds and swarms both share one characteristic—the thoughts, feelings, insights, and intuitions of human participants need to be captured and represented as data in an accurate manner that can be processed across trials and across populations. Inconsistencies in the data captured from participants, because of difficulties in expressing their internal thinking as external reports can significantly degrade the ability to amplify the intelligence of a population. Swarms outperform crowds because they capture data indicating behaviors of participants, but the requirement that all members of a swarm participate at the same time, is a logistical constraint. What is needed is a method that combines the asynchronous benefits of polling (i.e. the participants do not need to all be engaged at the same time) and the behavioral benefits of swarming (i.e. that participant don't just report, they interact over time, revealing far more about their internal thinking than they might even be able to consciously express). The present invention addresses this by create a new form of interactive behavioral polling, combined with machine learning, to optimize the collective intelligence and/or collective insights of populations.

Interactive Behavioral Polling and Machine Learning

Human participants possess deep insights across a vast range of topics, having knowledge, wisdom, and intuition that can be harnessed and combined to build an emergent collective intelligence. A significant problem, however, is that people are very bad at reporting the sentiments inside their heads and are even worse at expressing their relative levels of confidence and/or conviction in those sentiments. Reports from human participants are inconsistent from trial to trial, using scales that are highly non-linear, and highly inconsistent from participant to participant. To solve this problem, innovative methods and systems have been developed to change the process of poll-based "reporting" to a dynamic process of "behaving" such that behavioral data is collected and processed which gives far deeper insights into the true sentiments of human participants, as well as far deeper insights into the confidence and/or conviction that go with the expressed sentiments.

The methods and systems involve providing a question prompt, providing a dynamic interface with data that is tracked and stored over time, and providing a countdown timer that puts temporal pressure on the participant to drive their behavior.

The methods and systems further involve then providing the perturbation prompt which inspires the participant to adjust their answer, while again providing the dynamic interface with data that is tracked and stored over time, and providing the countdown timer that puts temporal pressure on the participant to drive their behavior. The perturbation prompt is an authoritative reference point which may be a real or fictional indication of an alternative view on the answer in many preferred embodiments. The usefulness of a fictional indication is that the direction and magnitude of the perturbation (with respect to the participant's initial answer) can be varied across the pre-planned spectrum across trials and across the population, so as to capture a spectrum of behavioral data for processing and machine learning.

Figure 4:
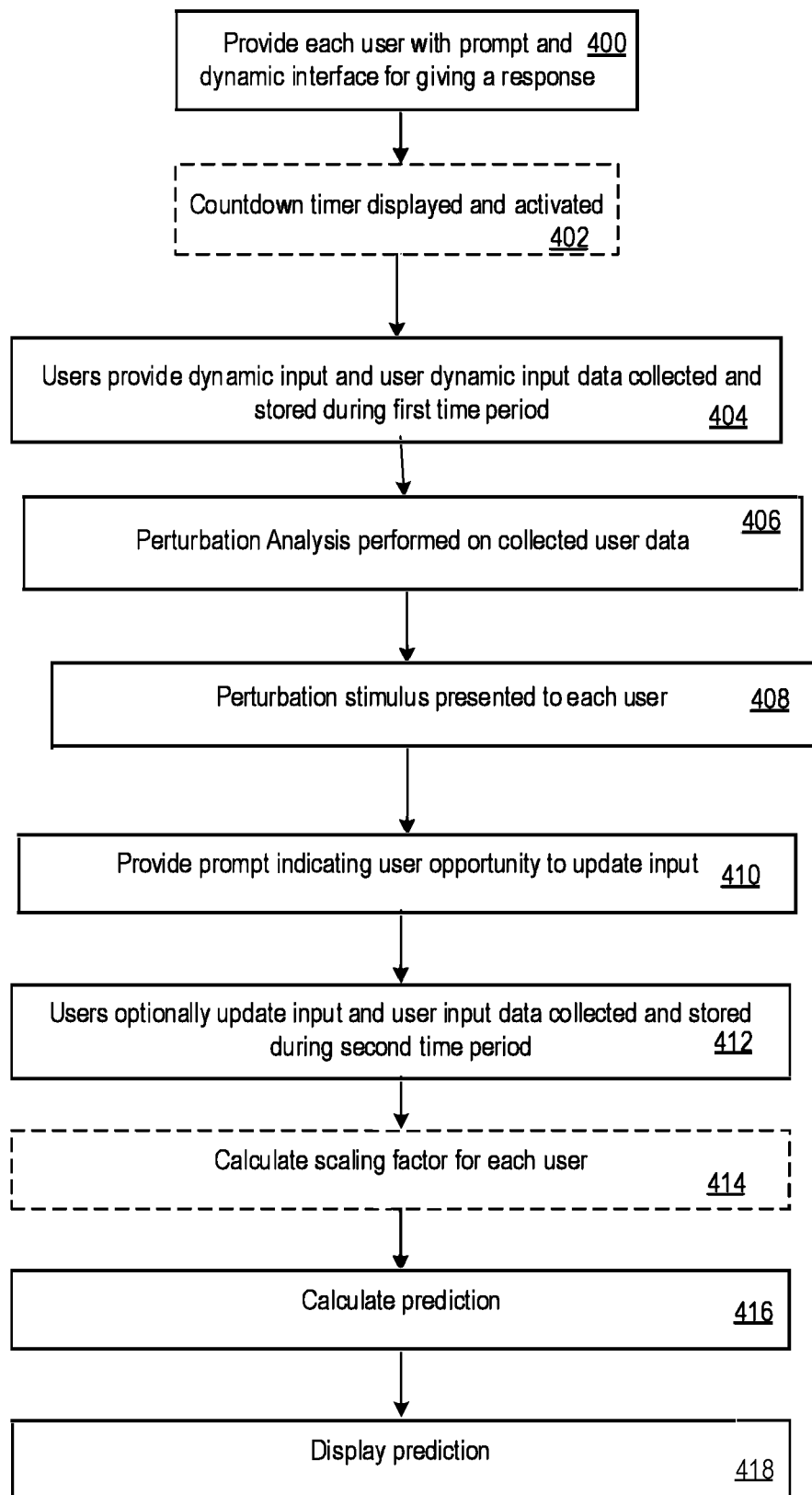
FIG. 4 is a flowchart of a method for interactive behavioral polling in accordance with some embodiments of the present invention.

Referring next to FIG. 4, a flowchart of a method for interactive behavioral polling in accordance with some embodiments of the present invention is shown. In one embodiment, the method is implemented with an embodiment of the distributed architecture described in the related applications (generally, with each user interacting with the computing device 100 and group computations performed by the CCS 142, although it will be understood that other suitable computing and networking systems may be used to implement the methods described herein). Dynamic user interfaces for an example of the interactive behavioral polling are shown in FIGS. 5-8.

Generally, Human participants possess deep insights across a vast range of topics, having knowledge, wisdom, and intuition that can be harnesses and combined to build a collective intelligence. A significant problem, however, people are very bad at reporting the sentiments inside their heads and are even worse at expressing their relative levels of confidence and/or conviction in those sentiments. Reports from human participants are inconsistent from trial to trial, using scales that are highly non-linear, and highly inconsistent from participant to participant. To solve this problem, these innovative methods and systems have been developed to change the process of poll-based "reporting" to a dynamic process of "behaving" such that behavioral data is collected and processed which gives far deeper insights into the true sentiments of human participants, as well as far deeper insights into the confidence and/or conviction that go with the expressed sentiments.

The interactive behavioral polling method involves providing a prompt to each user in the group, providing a dynamic interface with data that is tracked and stored over time, and providing a countdown timer that puts temporal pressure on each participant to drive their behavior.

The methods and systems further involve then providing a perturbation prompt which inspires each participant to adjust their answer, while again providing dynamic interface with data that is tracked and stored over time, and providing a countdown timer that puts temporal pressure on the participant to drive their behavior. The perturbation prompt is an authoritative reference point which may be a real or fictional indication of an alternative view on the answer in many preferred embodiments. The usefulness of a fictional indication is that the direction and magnitude of the perturbation (with respect to the participants initial answer) can be varied across the pre-planned spectrum across trials and across the population, so as to capture a spectrum of behavioral data for processing and machine learning.

A good way to describe the systems and methods enabled by the hardware and software disclosed herein is by example. In the example illustrated in FIGS. 5-9, the example is a sports prediction, although the same methods and systems can be used for financial predictions, political predictions, and other types of prediction. The same methods and systems can also be used for capturing and amplifying the accuracy of subjective sentiments, such as views and opinions of a population.

In this example, the objective is to predict the outcome of football games, forecasting both the winner of the game and the number of points the winner wins by. In this example, a set of 15 games will be forecast by a population of 100 human participants, with the objective of aggregating the data from the 100 human participants to generate the most accurate group forecast possible. Traditionally, this would be done by asking a single question and capturing static data, which has all the problems described above. In the inventive system and method, a dynamic process is provided using a unique interface, unique prompts, and unique timer, and a unique machine learning process.

FIGS. 5-9 show an exemplary user interface for a single user in the group for one forecasted game at various points in time during the interactive behavioral polling method of FIG. 4. This example is a sports prediction, although the same methods and systems can be used for financial predictions, political predictions, and other types of prediction. The same methods and systems can also be used for capturing and amplifying the accuracy of subjective sentiments, such as views and opinions of a population. In this example, the objective is to predict football games, forecasting both the winner of the game and the number of points the winner wins by. In this example, a set of 15 games will be forecast by a population of 100 human participants, with the objective of aggregating the data from the 100 human participants to generate the most accurate group forecast possible. Traditionally, this would be done by asking a single question and capturing static data, which has all the problems described above. In the inventive system and method, a dynamic process is provided using a unique interface, unique prompts, and unique timer, and a unique machine learning process.

Figure 5:
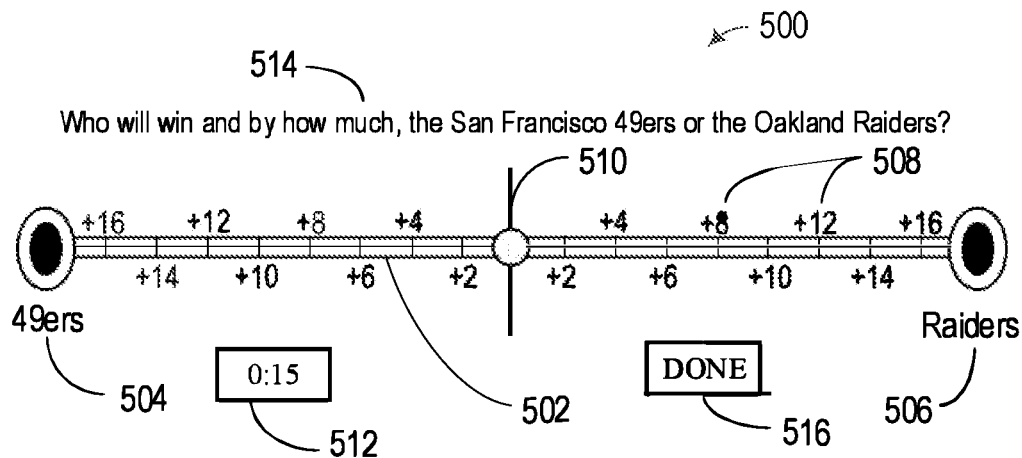
FIG. 5 is an exemplary user interface at a first point in time during an exemplary interactive behavioral polling session in accordance with some embodiments of the present invention.

In a first provide prompt and dynamic user interface step 400 of the interactive behavioral polling method, the CCS 142 sends to each computing device 100 instructions and data for displaying the prompt and the dynamic user interface. A dynamic user interface is presented to each user. As illustrated in FIG. 5, an exemplary user interface 500 is shown during the first step 400. The dynamic user interface 500 includes a selection line 502, a first choice 504 located at a left-hand end of the selection line 502, a second choice 506 at a right-hand end of the selection line 502, a plurality of selection values 508, each associated with a point on the selection line 502, and a moveable slider 510. In FIG. 5 the slider 510 is shown at an initial origin location on the selection line 502, but the slider 510 may initially be shown at any location on the selection line 502. Also shown is a countdown timer 512 and the prompt 514.

In this example, the first choice 504 is displayed as "49ers" and the second choice 506 is displayed as "Raiders". The selection values 508 range from +16 on the 49ers (left) side to +16 on the Raiders (right) side of the selection line 502. An origin is located at the center of the selection line 502. The prompt 514 is displayed as "Who will win and by how much, the San Francisco 49ers or the Oakland Raiders?".

It will be understood by those of ordinary skill in the art that although the exemplary interface is a slider, the dynamic data collecting and prompting methods can be achieved with a variety of other layouts.

As illustrated in the exemplary display 500, in this case the prompt 514 is a textual question, and the interface is a sliding-type interface. The prompt 514 will appear on the screen under software control of the computing device 100, allowing control of the exact timing of when the user reads the question and provides a response. In preferred embodiments, during step 402, the countdown timer 512 also initially appears. The countdown of the time will give time pressure to the user. As shown in FIG. 5 below, the slider 510 is moveable by the user along the selection line 502 and enables the user to choose which team will win, and by how many points, by positing the slider 510 to the left or right by a given amount. This can be done by a mouse or touchscreen interface, or by gesture interface. The display 500 may also include a "done" button 516, which would, during the time period, end the time period even if there is still time left in the time period.

In the next provide dynamic input step 404, during a pre-determined time period the user is allowed to provide input to indicate his response to the prompt. If the countdown timer 512 is shown, the countdown timer 512 counts down during the time period. During the dynamic input step 404, the computing device 100 tracks the user input, collecting data about the timing, position, speed, acceleration, and trajectory of the user's response using the dynamic interface (in this case the slider 512). Any time delay between the prompt 514 appearing on the display and a first motion of the slider 512 is captured as well. This behavioral information reflects not just a reported final answer, but also indicates the internal confidence and/or conviction the participant has in the expressed value, especially when processed by machine learning in later steps. For example, a slower movement of the slider may result in the user being assigned a lower confidence value.

Figure 6:
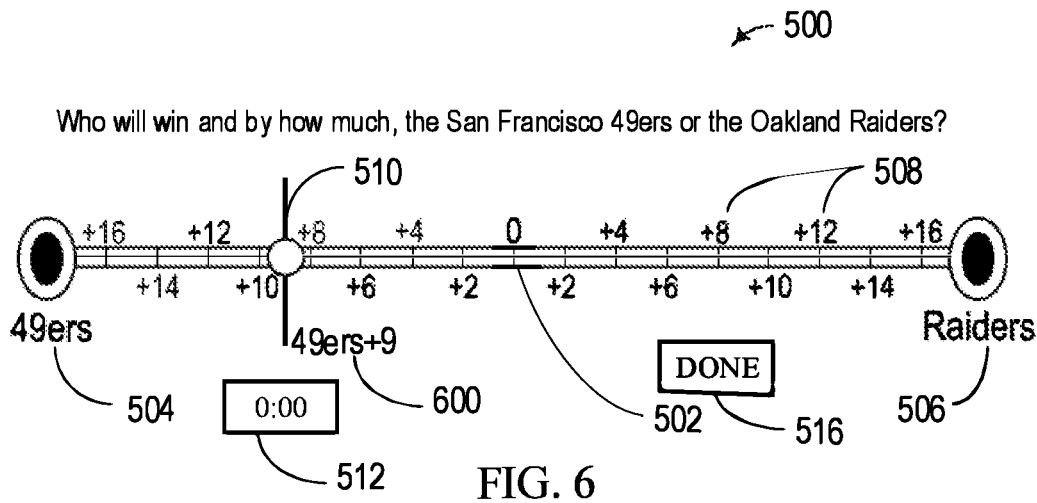
FIG. 6 is an exemplary user interface at a second point in time during the exemplary interactive behavioral polling session in accordance with some embodiments of the present invention.

An example of the dynamic interface 500 at the end of the first time period is shown in FIG. 6. In this example, the user has moved the slider 510 to a location on the left-hand side of the selection line 502, indicating a selection of the 49ers to win by 9 points.

In some embodiments, a textual indication 600 of the selection location may be shown. FIG. 6 also shows the countdown timer 512 reading "0:00", thus indicating to the user that the input time period has ended.

The system generally includes the countdown timer 512, so the user feels pressured to act promptly, but still has significant time—for example, 15 seconds counting down in the example above. The user might move the slider 510 quickly during the 15 seconds, or they might adjust and readjust, all of which is captured by the software. The system also generally includes the clickable or pressable "DONE" button (as shown in FIG. 5), indicating (before the time period is up) that the user has finished, allowing them to move on, even if the counter has not yet gotten to zero.

Again, the important thing is that the software tracks behavioral information for the user, not just the final resting position of the slider 510. This behavioral information includes (1) the time delay between the prompt and the user first grabbing the slider and moving it, (2) the speed of the slider, (3) the motion dynamics of the slider—does it go straight to an answer or does it overshoot and come back or does it get adjusted and readjusted during the allotted time period, as the countdown timer ticks down.

In the next perturbation analysis step 406, after the first time period has ended or the user clicks the "done" button 516, the software is then configured to determine (and then present to the user) a perturbation stimulus, which will drive a second round of behavior to be captured in real-time during a second time period. This may be an indicator telling them what an "EXPERT" thinks the answer is to the given prompt. This may be an indicator telling them what an "AI" thinks the answer is to the given prompt. This may be an indicator telling them what a "population" thinks the answer is to the given prompt. The primary goal is psychological—to inform them that a voice of authority and/or credibility has an alternate view to be considered. In many preferred embodiments, the perturbation is fictional. In other embodiments perturbation can be real (based on actual expert or AI or population). The population may be the group of users currently engaged with the behavioral polling method through individual computing devices 100 and the perturbation indicator may be derived based on a statistical mean or median of their initial input values prior to any perturbation.

In some preferred embodiments, the perturbation analysis step 406 includes collecting and processing user dynamic input data from a plurality of users responding to the prompt, each interacting with a computing device connected to the server, such that the perturbation stimulus is generated based at least in part on the data from the plurality of users responding to the prompt. In this way, a statistical mean or median or other statistical aggregation can be used alone or in part when generating the perturbation stimulus.

In some embodiments the perturbation indicator communicated to each of the plurality of computing devices is identical, such that all participants are given the same perturbation. In other embodiments, a distribution of perturbations is calculated and transmitted such that a range of perturbation indicators are communicated to the plurality of computing devices. In some such embodiments the distribution is a normal distribution. In some embodiments, the distribution is a randomized distribution. An inventive aspect of using a distribution is that the population of participants are provided with a range of unique perturbation stimuli and thereby provide a range of responses to said stimuli for analysis and processing.

In some embodiments the perturbation indicator computed and provided to a first group of participants is based on data collected from a second group of participants.

For this particular example embodiment, the perturbation is a fictional perturbation where the system displays a selection and identifies it as an "expert opinion". The perturbation may be randomly selected to be either higher or lower than the user's response, by a random margin. Or, instead of a random margin, a pre-planned distribution of margins across all users may be employed. For example, if 100 people were given this survey, a pre-planned distribution of margins (above or below the user's initial prediction) may be used for the expert perturbation, enabling the system to collect a diverse data set that has a range of desired perturbations. Alternately, a range of perturbations could be given not across all users who are answering this same question, but across each given user, across a set of predictions (for example, across a set of 10 games being predicted).

Figure 7:
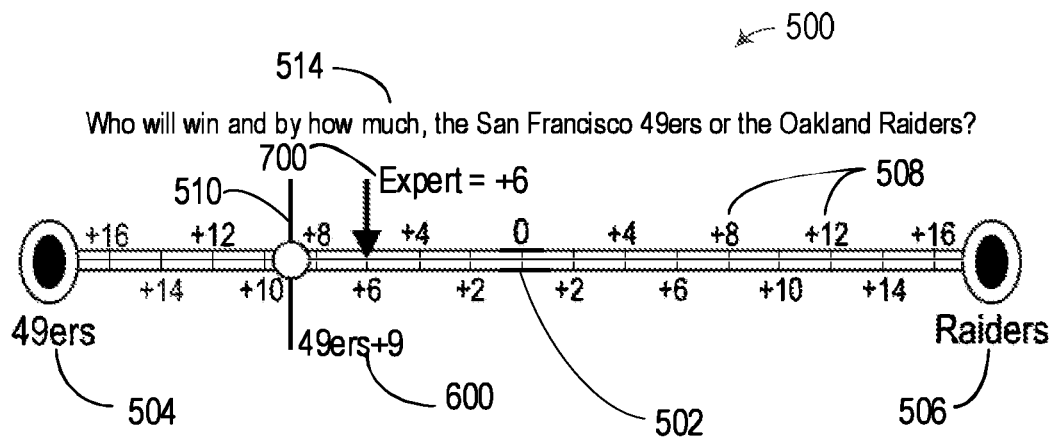
FIG. 7 is an exemplary user interface at a third point in time during the exemplary interactive behavioral polling session in accordance with some embodiments of the present invention.

In the present perturbation stimulus step 408, the perturbation stimulus is shown on the display. An example of the display of the perturbation stimulus is shown in FIG. 7, where a perturbation stimulus 700 is displayed as an arrow located at the +6 point on the left-hand side, with the accompanying text "Experts=+6", indicating to the user an "expert" selection of the 49ers winning by 6 points.

Next, in the provide prompt for updating step 410, The system is configured to prompt the user again, giving them the opportunity during a second time period to update their prediction. In the next second time period step 412, during the second time period the user has the option to adjust the location of the slider 510. In a preferred embodiment, a countdown timer again appears during the second time period, giving the user, for example, 15 seconds to update their prediction. The user could just click the "DONE" button 516 during the second period and not adjust the location of the slider 510. Or the user could adjust the location of the slider 510. During the second time period the software tracks not just the final answer, but again tracks the behavioral dynamics of the process—including (1) the time delay between the prompt and the user grabbing the slider 510 and (2) the speed of the slider motion, and (3) the trajectory of the slider motion, and (4) how quickly the user settles on an updated location. This additional behavioral data, during the second time period in response to the perturbation stimulus, is a further indicator of confidence/conviction in the answer given, especially when processed by machine learning.

Figure 8:
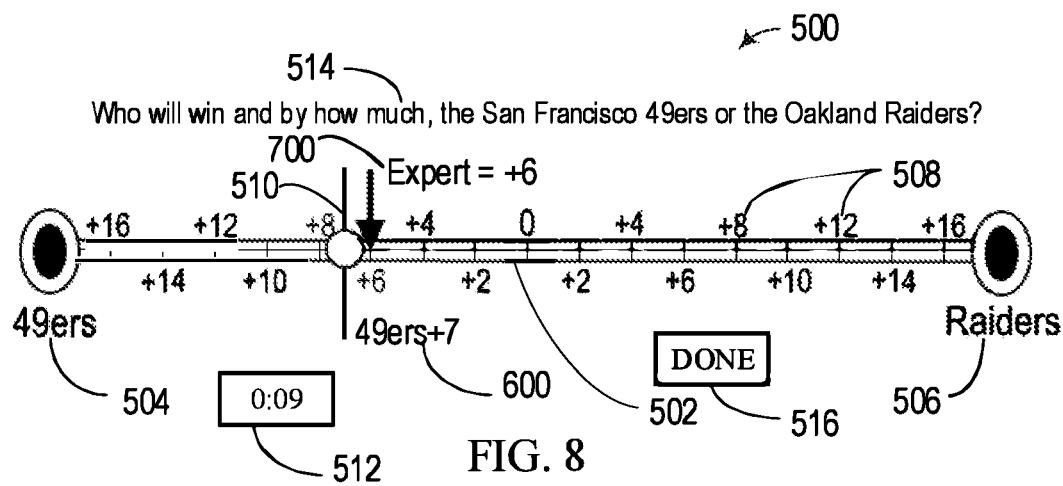
FIG. 8 is an exemplary user interface at a fourth point in time during the exemplary interactive behavioral polling session in accordance with some embodiments of the present invention.

FIG. 8 illustrates user input at a time during the second time period, where the user has adjusted the location of the slider 510 from the previous location of 49ers+9 to an updated location of 49ers+7 (as indicated by the position of the slider 510 and the textual indication 600). The updated position of the slider 510 for this particular user indicates that he or she tempered the personal prediction in response to the perturbation. Some users may not be influenced at all. Again, in many embodiments the prompt is fictional, although the user would not know that, for that allows the software to inject a fixed distribution of perturbation prompts across questions to a single user, and/or across the full population of users. In other embodiments, the prompt is not fictional but computed based on authoritative data, for example from an expert source or a computer model. In a particularly useful embodiment, the prompt is computed in real-time based on the initial data provided by the group of individuals engaging the behavioral polling system on the same question. Thus, the group of users provide input prior to the perturbation. The central server 142 computes a statistical mean or median of the groups input. A perpetration prompt is then generated and displayed based at least in part upon the statistical median or median of the group's input. In some embodiments, statistical variance is applied around the statistical mean or median to ensure that the population gets a range of values as stimuli, rather than all getting the same perturbation stimuli.

After the second time period is ended, in optional calculate scaling factor step 414, the computing device 100 (or the CCS 142, if the data is sent over the network to the CCS 142) calculates a scaling factor based on the data collected during the first and second time periods. This scaling factor could be then used when the user is participating in a real-time collaborative session, as previously described in the related applications.

Figure 9:
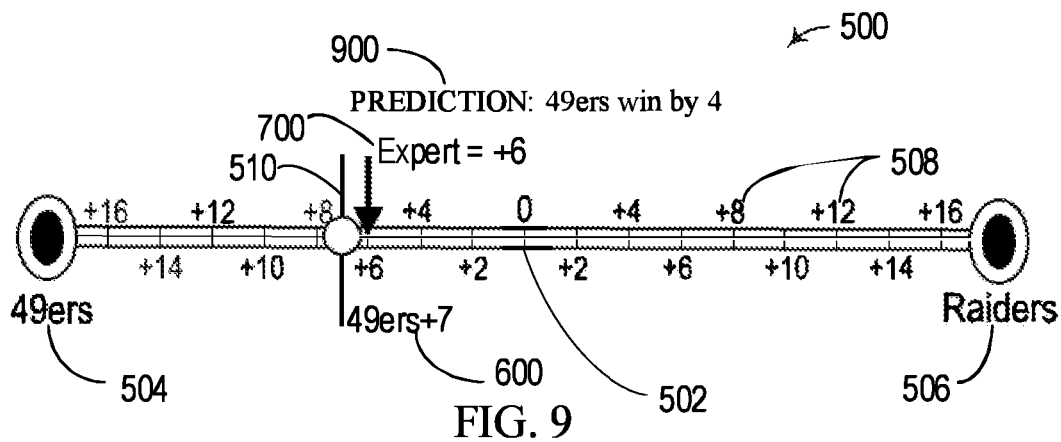
FIG. 9 is an exemplary user interface at a fifth point in time during the exemplary interactive behavioral polling session in accordance with some embodiments of the present invention.

In the next calculate prediction step 416, the CCS 142 receives the data from each user computing device 100 participating in the polling session, and computes a predication related to the prompt using the behavioral data collected from all users during the time periods, in addition to other data. In the optional final display prediction step 418, the CCS 142 sends an indication of the prediction to each computing device 100, and each computing device 100 displays the prediction on the display, as illustrated in FIG. 9, with a prediction 900 of the 49ers winning by 4 points shown. This forecast is not a simple average of the input reported from the 100 participants, but instead is a weighted aggregation, the weighting based at least in part on the behavioral data collected from participants reflecting their relative confidence and/or conviction in their individual responses.

Behavioral data for each user for each polling session is stored. At the completion of all instances of the dynamic poll, across the set of questions (for example all 15 NFL football games being played during a given week) and across a population (for example, 100 football fans), a detailed and expressive behavioral data set will have been collected and stored in the database of the system (for example, send to and stored in the CCS 142)—indicating not just a set of final predictions across a set of users, but representing the confidence and/or conviction in those predictions, especially when processed by machine learning. In some embodiments the data obtained during the interactive behavioral polling method can be used to identify from a group of users a sub-population of people who are the most effective and/or insightful participants, to be used in a real-time swarming process.

Typical "Wisdom of Crowds" for making a sports prediction collects a set of data points for a particular game, wherein each data point would indicate each user's single forecast for which team will win, and by how much. If there were 100 users predicting the 49ers/Raiders game, the process would generate an average value across the simple data set and produce a mean. The problem is, every user in that group has (a) a different level of confidence and/or conviction in their answer, (b) they are very poor at expressing or even knowing their confidence, and (c) if asked to report their confidence, every individual has a very different internal scale—so confidence can't be averaged with any accuracy. Thus, traditional methods fail because they combine predictions form a population of very different individuals, but those values are not all equivalent in their scales, confidence or accuracy.

Figure 10:
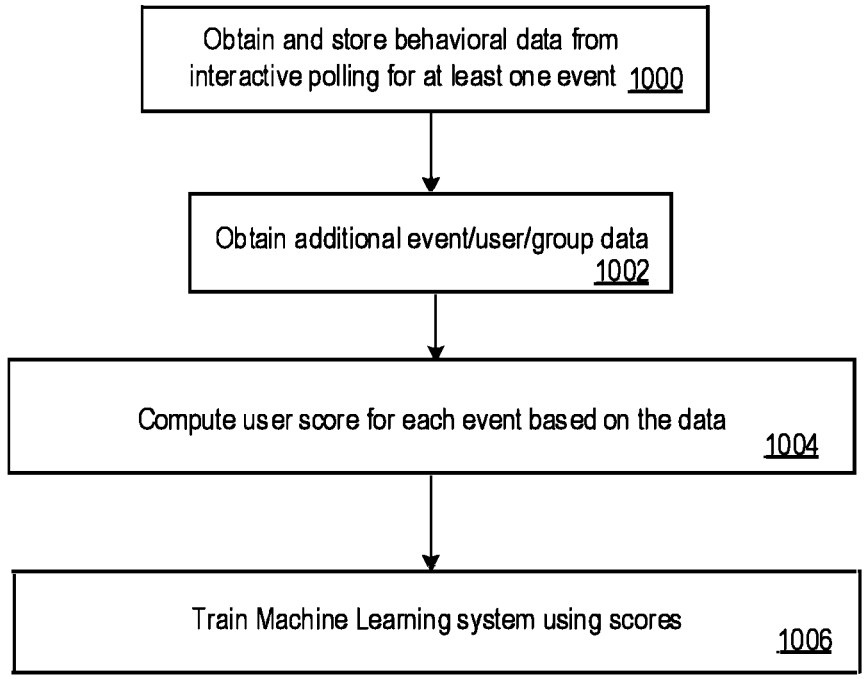
FIG. 10 is a flowchart for training a Machine Learning algorithm using behavioral data in accordance with one embodiment of the present invention.

To solve this problem, the unique behavioral data collected in the steps of FIG. 4 above, combined with unique machine learning techniques, has enabled us to scale (and aggregate) the contributions of each participant in the population based on a more accurate indication of their relative confidence in their personal predictions, and/or the relative accuracy of those predictions. An exemplary flowchart for training a Machine Learning algorithm using the behavioral data is shown in FIG. 10.

In a first obtain and store behavioral data step 1000, the system collects behavioral data using the interactive polling method as previously described. For example, the system collects behavioral data that includes thinking delay time between when the prompt 514 appears on the screen for a given user and that user starts to move the slider 510, in combination with elapsed time taken for the user to settle on an initial answer using the slider 510, the max speed of the slider 510, and the total distance traveled of the slider 510 over time (including overshoots and/or double-backs), along with the user's answer value for the initial prompt phase, and the adjustment amount that the user changed their answer when prompted with a perturbation, as well as the elapsed time taken for the adjustment, the max speed during the adjustment, and the total distance traveled of the slider 510 during the adjustment (including overshoots and/or double-backs).

In the next obtain additional data step 1002, additional event/user/group data is obtained. For example, in some embodiments, the system collects and/or computes, for each user, the amount of time they spent pulling away from the majority sentiment in the population. In addition to the above behavioral data, the system also may also collect and store data regarding how correct each user was in their initial estimate, as well as how correct they were in their final estimate in the face of the perturbation. In some embodiments, the users are required to also engage in a real-time swarm, where how much time the user spends pulling against the swarm (i.e. being defiant to the prevailing sentiment) is tracked.

In some embodiments, users are asked "How much would you bet on this outcome?" as a means of gathering further confidence data. In some such embodiments, the dynamic behavioral data is used to estimate confidence by training on the correlation between the behavioral data and the "How much would you bet on this outcome?" answers. (This is called 'dollar confidence' in our current methods).

In some embodiments, webcam data is collected from users during the interactive period while they are dynamically manipulating the slider input in response to the prompt. This webcam data, which is configured to capture facial expressions, is run through sentiment analysis software (i.e. facial emotion determination and/or sentiment determination and/or engagement determination) to generate and store sentiment, emotion, and/data engagement data from each user. For example, tools like Emotient® and/or EmoVu may be used, or other suitable emotion detection API. Facial emotion, sentiment, and/or engagement data collected during the first time period, and separately collected during the second adjustment time period driven by the perturbation, are stored for users for each question they answer. Facial data is thus a secondary form of behavioral data, indicating confidence and/or conviction of users during their interactive responses. This data can then be used in later steps to (a) optimize predictions of confidence in the answer, and/or (b) optimize predictions of accuracy in the answer.

In the computer user score step 1004, the system computes a user score using an algorithm and the obtained data. In one example, the system computes a skill score for each user. Using a football game as an example, if the true outcome of the game is +4, and the user's initial guess is +9, the user might get an initial accuracy score of: |4−9|=5, where the lower the score, the better, with a perfect score being 0. If their updated score was +8, they will get an updated accuracy score of: |4−8|=4, where the lower the score, the better, with a perfect score being 0. The updated accuracy score is also calculated with consideration as to whether the perturbance was an influencer towards the correct score, or away from the correct score. In one such embodiment, the updated accuracy score could be a function of both the user's initial and final skill scores. As an example, if the user's initial guess is +9, and then after the perturbation gives a final guess of +7, where the true outcome of the game is +4, the skill score may be calculated as: |4−9|+|4−7|=8. These scores act as a measure of the user's skill in prediction overall.

In other embodiments, instead of computing accuracy (i.e. how correct the initial prediction and updated predictions were), the system computes scores for user confidence and/or conviction. Defiance time can used by the current system to compute a defiance score. The defiance score and/or other real-time behavioral data is of unique inventive value because it enables weighting of participants without needing historical performance data regarding the accuracy of prior forecasts.

In the final train machine learning algorithm step 1006, the behavioral data and/or the user scores are used to train a machine learning system. For example, the system can train the machine learning algorithm on user confidence and/or conviction scores. The system can train a machine learning algorithm using the defiance score to estimate the defiance time of each user. With this estimate, we are able to weight new users' contributions to new crowds based on their estimated defiance time, thereby increasing the accuracy of the new crowd.

By training a Machine Learning algorithm on these scores, the system can predict which users are more likely to be most skillful at answering the question (e.g. generating an accurate forecast) and which users are less likely to do so. With this predicted skill level, the software of the system is then able to weight new users' contributions to new crowds (or swarms) based on their behavioral data and the combination of other factors, thereby increasing the accuracy of the new crowd (or swarm).

The dynamic behavioral data obtained can be used in an adaptive outlier analysis, for example as previously described in related application Ser. No. 16/059,658 for ADAPTIVE OUTLIER ANALYSIS FOR AMPLIFYING THE INTELLIGENCE OF CROWDS AND SWARMS. For example, the behavioral data can be used in combination with other characteristics determined from the survey responses for use in machine learning, including the outlier index for that user, as described in the aforementioned related patent application. The contribution of each user to that statistical average can be weighted by (1−Outlier_Index) for that user. Similarly, when enabling users to participate in a real-time swarm, the User Intent values (as disclosed in the related applications) that are applied in real time, can be scaled by a weighting factor of (1−Outlier_Index) for that user. In this way, users are statistically most likely to provide incorrect insights are either removed from the population and/or have reduced influence on the outcome. What is significant about this method is that it does not use any historical data about the accuracy of participants in prior forecasting events. It enables a fresh pool of participants to be curated into a population that will give amplified accuracy in many cases.

In addition to using the behavioral data disclosed above to make a more accurate crowd prediction, as described above, it is also useful to use the behavioral data to identify from the population, a sub-population of people who are the most effective and/or insightful participants, to be used in a real-time swarming process. The present invention enables the curation of human participants by using dynamic behavioral data in two inventive forms—(I) taking an initial pool of baseline participants and culling that pool down to a final pool of curated participants which are then used for crowd-based or swarm-based intelligence generation, and/or (II) taking a pool of baseline participants and assigning weighting factors to those participants based on their likelihood of giving accurate insights (i.e. giving a higher weight within a swarm to participants who are determined to be more likely to give accurate, correctly-confident insights than participants who are determined to be less likely to give accurate, over- or under-confident insights). In some inventive embodiments, both culling and weighting are used in combination—giving a curated pool that has eliminated the participants who are most likely to be low insight performers, and weighting the remaining members of the pool based on their likelihood of being accurate insight performers.

For example, the behavioral data described above, may be used in some embodiments, in combination with other characteristics determined from the survey responses for use in machine learning, including the OUTLIER INDEX for that user, as described in the aforementioned co-pending patent application Ser. No. 16/059,658.

The contribution of each user to a question in a crowd can be weighted by a machine-learned representation of their confidence and predicted accuracy. Similarly, when enabling users to participate in a real-time swarm, the User Intent values that are applied in real time can be scaled by a weighting factor that is machine-learned from the Outlier index and behavioral data. In this way, users are statistically most likely to provide consistently incorrect insights are either removed from the population and/or have reduced influence on the outcome. What is significant about this method is that it does not use any historical data about the accuracy of participants in prior forecasting events. It enables a fresh pool of participants to be curated into a population that will give amplified accuracy in many cases. (This amplification is based only on analysis of that users responses and behaviors to the current set of questions, which does not require historical accuracy data for that user).

In some embodiments of the present invention, a plurality of values are generated for each participant within the population of participants that reflect that participant's overall character across the set of events being predicted. outlier index is one such multi-event value that characterizes each participant with respect to the other participants within the population across a set of events being predicted. In addition, a confidence INDEX is generated in some embodiments of the present invention as a normalized aggregation of the confidence values provided in conjunction with each prediction within the set of predictions. For example, in the sample set of questions provided above, each prediction includes Confidence Question on a scale of 0% to 100%. For each user, the confidence index is the average confidence the user reports across the full set of predictions, divided by the average confidence across all users across all predictions in the set. This makes the confidence index a normalized confidence value that can be compared across users. In addition, multi-event self-assessment values are also collected at the end of a session, after a participant has provided a full set of predictions.

In some embodiments of the present invention, a plurality of multi-event characterization values are computed during the data collection and analysis process including (1) Outlier Index, (2) Confidence Index, (3) Predicted Self Accuracy, (4) Predicted Group Accuracy, (5) Self-Assessment of Knowledge, (6) Group-Estimation of Knowledge, (7) Behavioral Accuracy Prediction, and (8) Behavioral Confidence Prediction. In such embodiments, additional methods are added to the curation step wherein Machine Learning is used to find a correlation between the multi-event characterization values and the performance of participants when predicting events similar to the set of events.

In such embodiments, a training phase is employed using machine learning techniques such as regression analysis and/or classification analysis employing one or more learning algorithms. The training phrase is employed by first engaging a large group of participants (for example 500 to 1000 participants) who are employed to make predictions across a large set of events (for example, 20 to 40 baseball games). For each of these 500 to 1000 participants, and across the set of 20 to 40 events to be predicted, a set of values are computed including an Outlier Index (OI) and at least one or more of a Confidence Index (CI), a Predicted Self Accuracy (PSA), a Predicted Group Accuracy (PGA), a Self-Assessment of Knowledge (SAK), a Group Estimation of Knowledge (GAK), a Behavioral Accuracy Prediction (BAP), and a Behavioral Confidence Prediction (BCP).

In addition, user performance data is collected after the predicted events have transpired (for example, after the 20 to 40 baseball games have been played). This data is then used to generate a score for each of the large pool of participants, the score being an indication of how many (or what percent) of the predicted events were forecast correctly by each user. This value is preferably computed as a normalized value with respect to the mean score and standard deviation of scores earned across the large pool of participants. This normalized value is referred to as a Normalized Event Prediction Score (NEPS). It should be noted that in some embodiments, instead of discrete event predictions, user predictions can be collected as probability percentages provided by the user to reflect the likelihood of each team winning the game, for example in a Dodgers vs. Padres game, the user could be required to assign percentages such as 78% likelihood the Dodgers win, 22% likelihood the Padres win. In such embodiments, alternate scoring methods may be employed by the software system disclosed here. For example, computing a Brier Score for each user or other similar cost function.

The next step is the training phase wherein the machine learning system is trained (for example, using a regression analysis algorithm or a neural network system) to find a correlation between a plurality of the collected characterization values for a given user (i.e. a plurality of the Outlier Index, the Confidence Index, a Predicted Self Accuracy, a Predicted Group Accuracy, a Self-Assessment of Knowledge, a Group Estimation of Knowledge, a Behavioral Accuracy Prediction, and a Behavioral Confidence Prediction) and the Normalized Event Prediction Score for a given user. This correlation, once derived, can then be used by the inventive methods herein on characterization value data collected from new users (new populations of users) to predict if the users are likely to be a strong performer (i.e. have high normalized Event Prediction Scores). In such embodiments, the machine learning system (for example using multi-variant regression analysis) will provide a certainty metric as to whether or not a user with a particular combination of characterization values (including an Outlier Index) is likely to be a strong or weak performer when making event predictions. In other embodiments, the machine learning system will select a group of participants from the input pool of participants that are predicted to perform well in unison.

Thus, the final step in the Optimization and Machine Learning process is to use the correlation that comes out of the training phase of the machine learning system. Specifically, the trained model is used by providing as input a set of characterization values for each member of a new population of users, and generating as output a statistical profile for each member of the new population of users that predicts the likelihood that each user will be a strong performer based only on their characterization values (not their historical performance). In some embodiments the output is rather a grouping of agents that is predicted to perform optimally. This is a significant value because it enables a new population of participants to be curated into a high performing sub-population even if historical data does not exist for those new participants.

Non-Linear Probabilistic Wagering

To solve the problem of obtaining authentic, accurate, and consistent expressions of confidence for a user making a prediction, an innovative approach for soliciting confidence from human forecasters has been developed. Rather than ask participants to assign probabilities to their forecast (which is too abstract for most participants to accurately provide), or asking participants to place simple wagers on outcomes (which is too susceptible to variations in risk tolerance), a new methodology has been created where participants express the relative probability of each outcome, but do so in a way that is presented as an authentic wager, and which motivates participants to be as accurate as they can.

This solution is called Non-Linear Probabilistic Wagering (NPW). It is a methodology in which the participants (a) are asked to place a wager on each outcome, thereby requiring them to make an authentic assessment of their confidence in each possible result, and (b) requires users to distribute capital between the possible outcomes, based not on a simple linear scale as is used in traditional wagering, but using a novel Mean Square Difference scale.

Figure 11:
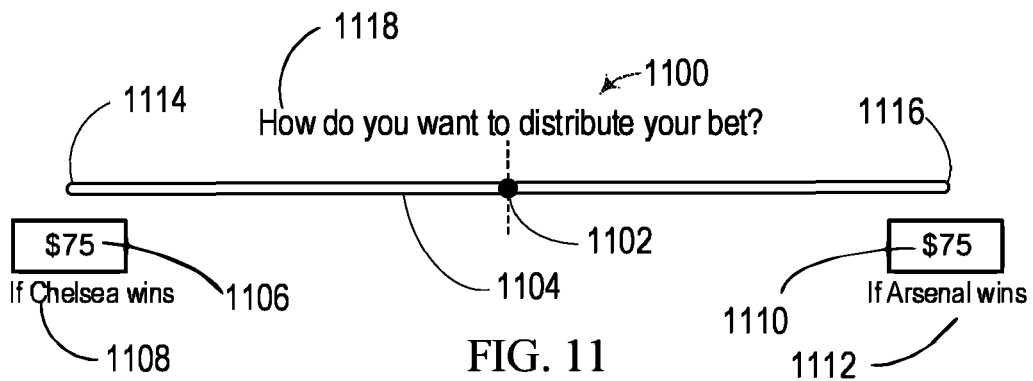
FIG. 11 is an exemplary slider interface display with a slider at a neutral position, in accordance with one embodiment of the present invention.

Furthermore, the innovation enables distribution of wagers in response to an easily understood interface control, like a slider interface or dial interface. This allows participants to move an element (like a slider) and adjust the relative wagers on the possible outcomes of a forecasted event, the non-linear computations happening automatically. An example slider interface display 1100 including a slider selection line 1104 with a slider 1102 (also referred to in general as a user manipulatable wager marker) at a neutral (center) position is shown in FIG. 11.

It's important to note that the above exemplary slider interface display 1100, while appearing simple, performs unlike any prior confidence interface that we know of. As will be described later in this document, the values assigned to each side of the slider selection line 1102 vary with slider position in a unique and powerful way.

Specifically, this method enables participants to place wagers upon the predicted outcomes but does so using a unique non-linear scale that models probabilistic forecast without the users needing to be skilled in thinking in terms of probabilities or even needing to know anything about probabilities.

The users just need to think in terms of wagers. In some embodiments the users are authentically motivated, for example when their compensation is tied to the true outcome of these events. For example, the users only win wagered amounts (real winnings or simulated points) for the outcome that actually happens in the real event.

Figure 12:
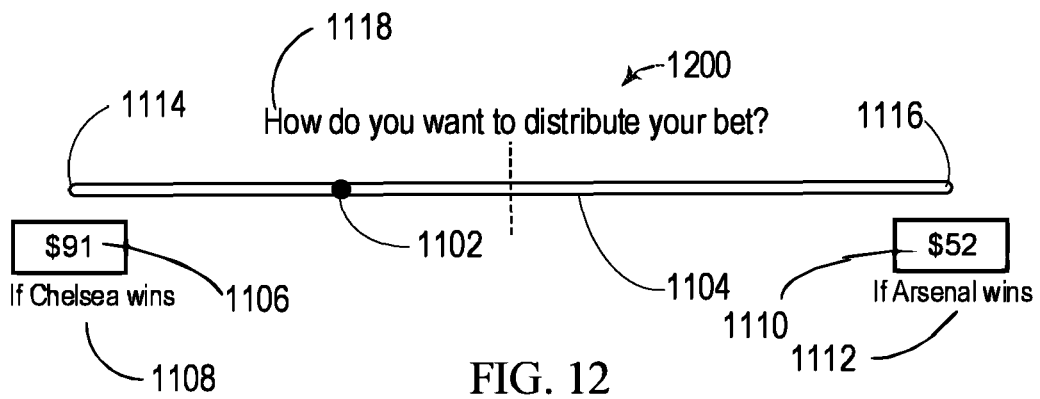
FIG. 12 is the exemplary slider interface display of FIG. 11 with the slider in a second position.
Figure 13:
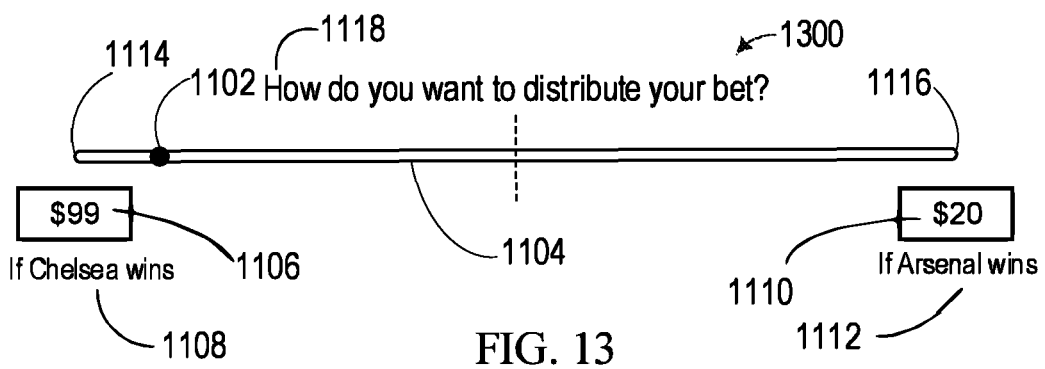
FIG. 13 is the exemplary slider interface display of FIG. 11 with the slider in a third position.
Figure 14:
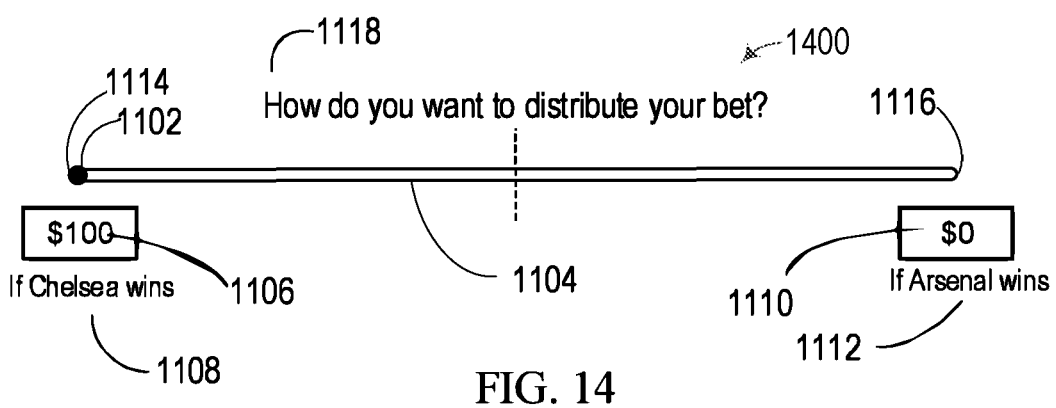
FIG. 14 is the exemplary slider interface display of FIG. 11 with the slider in a fourth position.

This method can be described with respect to the sequence of slider positions shown in the FIGS. 11-14. FIGS. 11-14 represent a single slider interface at different positions chosen by a user, wherein each position reflects different split wagers defined in software by the novel mean-squared-difference scale. FIG. 11 shows a linear slider interface display 1100 with the slider 1102 at a neutral (center) position on the slider selection line 1104 between a first limit 1114 and a second limit 1116. First limit 1114 is visually associated with a first (left-hand) outcome 1108 and second limit 1116 is visually associated with a second (right-hand) outcome 1110. FIG. 12 shows the slider interface display 1200 with the slider 1102 adjusted to a position on the slider selection line 1104 closer (leftward) to the first limit 1114. FIG. 13 shows a slider interface display 1300 with the slider 1102 adjusted to a position on the slider selection line 1104 even closer to the first limit 1114. FIG. 14 shows a slider interface with the slider 1102 adjusted to the first limit 1114.

Figure 15:
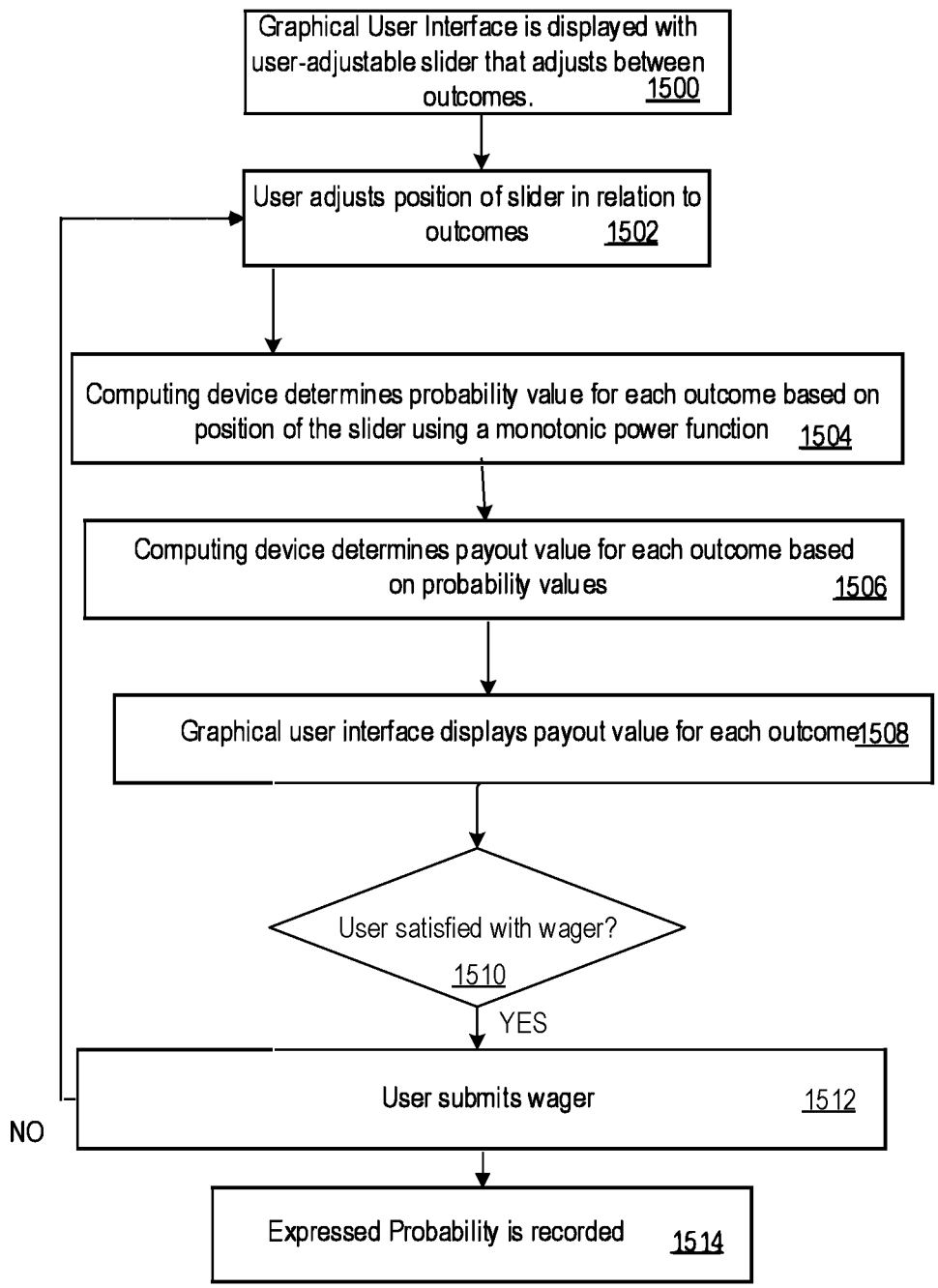
FIG. 15 is a flowchart of a wagering method in accordance with another embodiment of the present invention.

Referring next to FIG. 15, a flowchart of an embodiment of the novel wagering method is described with reference to FIGS. 11-14.

In the present embodiment, the methods are executed by one or more software routines configured to run on the processor of the computing device. In the initial display user interface step 1500, first, a graphical user interface is displayed, in this case the linear slider interface display 1100, with the amount paid for each outcome (first reward value 1106 and second reward value 1110) clearly identified. In step 1502 the user can adjust some aspect of this interface (in the examples of FIGS. 11-14, the slider 1102 moved linearly along the selection line 1104 between the two outcomes) to demonstrate their belief in either outcome 1108, 1112, as shown in FIGS. 12-14, where the slider 1102 has been moved along the selection line 1104 towards the first outcome 1108. Each location on the slider interface display 1100, 1200, 1300, 1400 has some associated probability (not shown to the user) of the leftmost event (in the exemplary display "Chelsea wins") as p1, and the rightmost event (in the exemplary display as "Arsenal wins") as 1−p1. These probabilities are referred to as forecast probability values. The probabilities associated with each location must be monotonic (probability only increasing as the slider approaches the target), but they do not have to be linear. In some embodiments the monotonic power function is a mean-squared function. In step 1504, the probabilities for the current slider location is determined. In step 1506, the new outcome reward values 1106, 1110 are calculated based on the slider 1102 location as:

$$\text{Pay if Chelsea Wins}=100*(1-(1-p1)^2)$$

$$\text{Pay if Arsenal Wins}=100*(1-(p1)^2)$$

In this way the reward values 1108, 1110 are interactively responsive to the position of the slider 1102. In some embodiments, such as shown in FIGS. 11-14, the first and second reward values are dollar amounts.

In step 1508 the reward values 1106, 1110 are updated in the display 1100, 1200, 1300, 1400 in real time to reflect the interface's current pay-outs.

In the next decision step 1510, the user decides whether he is satisfied with his wager. If the user is satisfied, the method proceeds to step 1512 and the user submits the wager with the slider at the current value. If the user is not satisfied with the wager, the method returns to step 1502, and modifies the slider location. In this way the user can interact with the interface until they are satisfied with the wager split and submit their wager (for example, the wagers shown in FIGS. 11-14 could be different interactions of the user during the session). In step 1514, the probabilities (one for each outcome) that define the submitted wager are recorded as the Expressed Probability (also referred to as the forecast probability values). The Expressed Probability is the probabilities that the user placed on the outcome through the wagering interface.

In some embodiments, the system comprises a first a first software routine configured to run on the processor, the first software routine configured to repeatedly update a first and a second reward value in response to user manipulation of a wager marker between a first limit and a second limit, the first software routine using a non-linear model for updating the first and second reward values in response to linear manipulation of the wager marker, the non-linear model following a monotonic power function that is implemented such that a non-linear increase in the first reward value corresponds to a non-linear decrease of the second reward value, and a non-linear increase in the second reward value corresponds to a non-linear decrease in the first reward value.

In some embodiments the system comprises a second software routine configured to run on the processor and determine a final first reward value and a final second reward value based upon a final position of the wager marker.

In some embodiments the system comprises a third software routine configured to run on the processor and generate a forecast probability value associated with each of the two possible outcomes based upon the final position of the wager marker between the two limits, the forecast probability value being a linear function of the position of the wager marker.

In some embodiments the system comprises a scoring software routine configured to run on the processor, the scoring software routine configured to be executed after an actual outcome of the future event is known, the scoring software routine configured to assign a score to the user based at least in part upon the final reward value associated with the actual outcome.

In some embodiments the Expressed Probability is then mapped to an Implied Probability, which represents the real-world probability of the event after accounting for human biases and individual risk aversion.

Another inventive aspect of this methodology is the mapping of Expressed to Implied probabilities, which can be computed based on either (a) behavioral and/or performance history of a general pool of participants, (b) the behavioral and/or history of this user, or (c) a combination of a and b.

For example, one mapping can be found using a technique called Driven Surveys. In this novel technique, individuals interact with the Probabilistic Wagering program over a series of survey questions and are paid a bonus depending on their wagering success. The questions have a known probabilistic outcome, which the users are told about, and then they are asked to distribute wagers using the unique slider system above. In this way, we get a direct mapping between probabilities that are known to the users and the wager splits that they produce from authentic visceral response.

Figure 16:
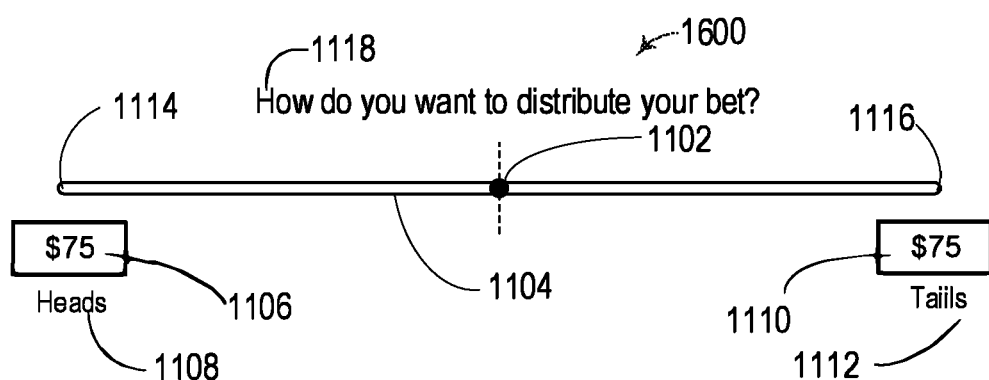
FIG. 16 is an exemplary slider interface display with a slider in a neutral position, in accordance with another embodiment of the present invention.
Figure 17:
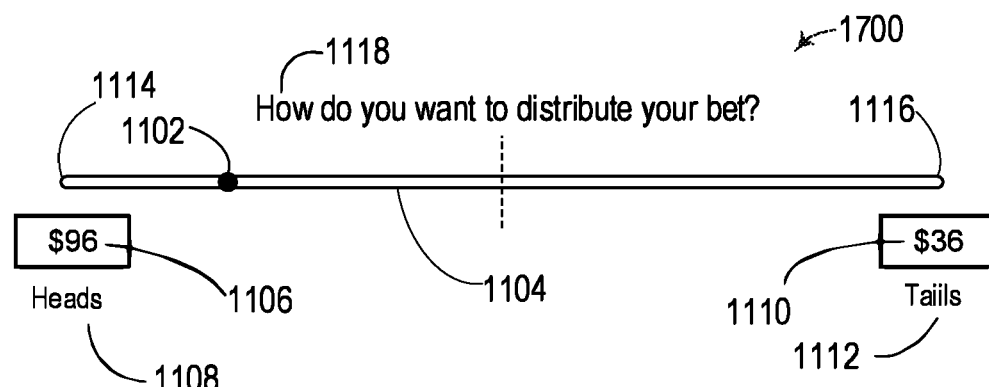
FIG. 17 is the exemplary slider interface display of FIG. 16 with the slider in a first position.

In the example shown in FIGS. 16 and 17, in an example question in a Driven Survey, a participant may be told that they are flipping a loaded coin. This particular coin has an 80% chance of turning up heads, and a 20% chance of turning up tails. Through the Probabilistic Wagering system described above, they can assign their dollar amounts to both heads and tails in whatever proportion they believe is best for their potential gains. An example slider interface display 1600 with the first outcome 1108 as "heads" and the second outcome 1112 as "tails" is shown below in FIG. 16 with the slider 1102 in the starting (center) position on the selection line 1104.

But again, the odds in this example were "driven" such that the user knows there is an 80% change of Heads turning up, and a 20% chance of tails. The user proceeds to adjust the position of the slider 1102 according to the method of FIG. 15. How the user adjusts the slider 1102 position is recorded, with the reward values 1106, 1110 numbers varying based on the equations above. In this particular case, users will generally give results that deviate from the true probabilistic equation, enabling us to then calibrate using a heuristic, a linear regression, or a machine learning model. The slider 1102 position for ideal mapping is shown in the slider interface display 1700 of FIG. 17.

As you can see, the dollar amounts for reward values 1106 and 1110 in FIG. 17 are not obvious in their relation to 80%, which is the power of this method—it hides the probabilistic nature of the forecast, evoking purely visceral responses, which can then be calibrated through a mapping from Expressed Probability to Implied Probability.

After the survey is complete and the results of the simulated coin flips known, they receive pay (or points) in proportion to the wagers they made. This motivates users to place their wagers in the proportion they believe will maximize their expected return, rather than splitting their money evenly or placing it all on one side.

This process allows the Implied Probability (the wager that the user made) to be associated with the true probability of an event (the likelihood of a coin flipping heads) for any individual who takes this test. Additionally, it allows generalizations to be made about the mapping for an average person by taking the statistical average over all users who have taken the test.

Figure 18:
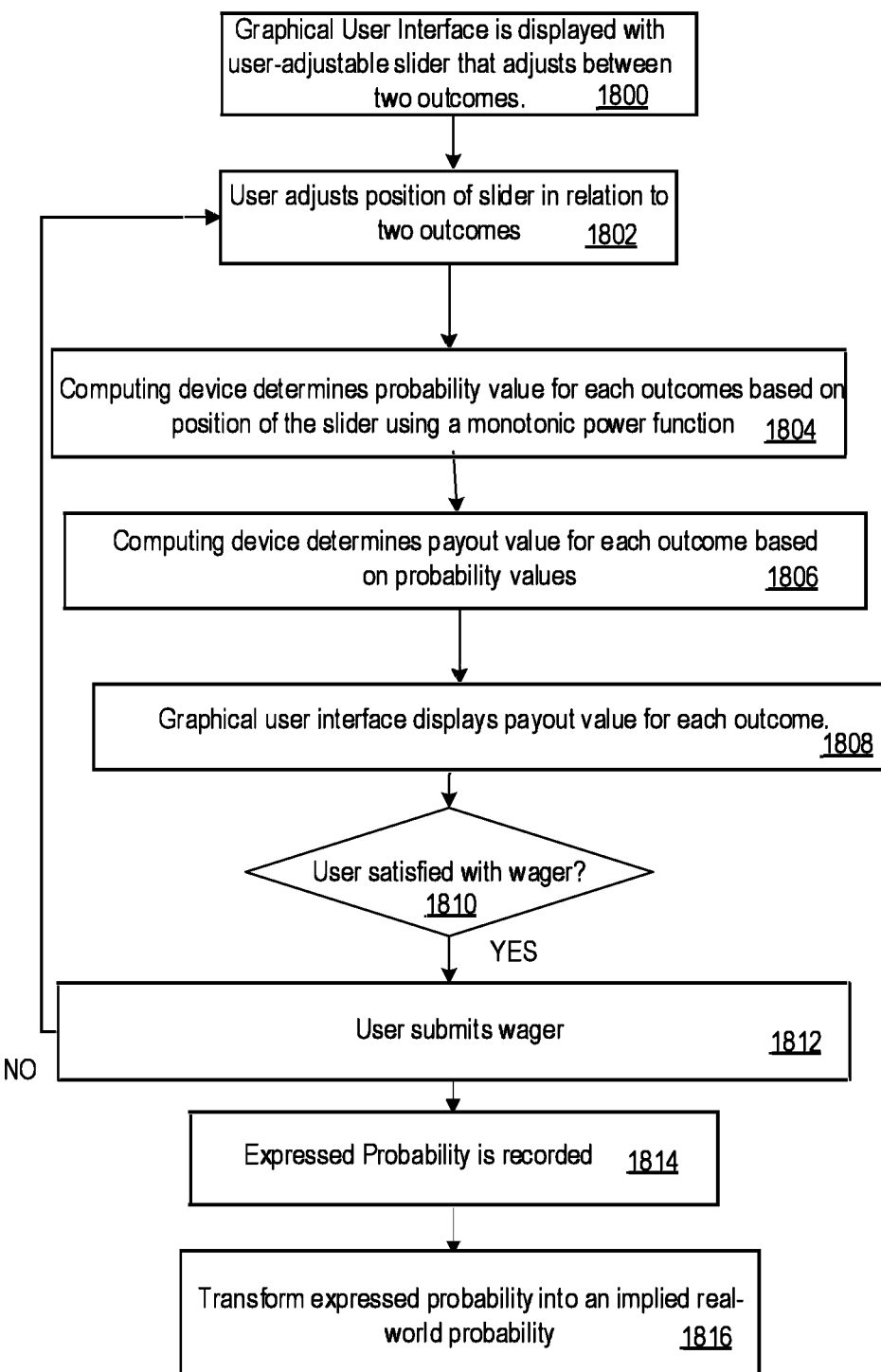
FIG. 18 is a flowchart of a wagering method including expressed and implied probabilities in another embodiment of the present invention.

This unique method can be described by the flowchart of FIG. 18. Steps 1800 through 1814 operate the same as the analogous steps in the flowchart of FIG. 15. In step 1814 (analogous to step 1514 of FIG. 15), the Expressed Probability is recorded. The method then proceeds to step 1516, where the expressed probability value based on the slider location is transformed into the Implied Probability. Using a historical knowledge of the user or of users in general, the system transforms the expressed probability into an implied real-world probability of the event. This can be normalized for varying levels of human bias and individual risk-aversion in a measurement.

Referring again to FIG. 18, in some embodiments the system comprises an additional bias calibration software routing configured to run on the processor and take as input the forecast probability values (the expressed probability) and generate as output a calibrated forecast value (implied real-world probability value).

In some embodiment the bias calibration routine uses an optimized mapping from the forecast probability values to the calibrated forecast value, where the mapping is generated using historical data captured for a population of users who have previously used the interactive system, the historical data including forecast probability values and known outcomes for a set of prior events.

In some embodiments the bias calibration routine uses an optimized mapping from forecast probability values to the calibrated forecast value, where the mapping is generated using historical data captured for the user during a series of previous uses of the interactive system, the historical data including forecast probability values and known outcomes for a set of prior events.

One thing that both poll-based methods and swarm-based methods have in common when making predictions based on input from populations of participants, is that a smarter population generally results in more accurate forecasts. As disclosed in co-pending U.S. patent application Ser. No. 16/059,698 by the current inventors, entitled "ADAPTIVE POPULATION OPTIMIZATION FOR AMPLIFYING THE INTELLIGENCE OF CROWDS AND SWARMS" which is hereby incorporated by reference, methods and systems are disclosed that enables the use of polling data to curate a refined population of people to form a swarm intelligence. While this method is effective, by incorporating improved assessments of participant confidence using the unique NPW process above, deeper and more accurate assessments of human confidence and human conviction are attained and used to significantly improve the population curation process. Specifically, this enables higher accuracy when distinguishing members of the population of are likely to be high-insight performers on a given prediction task as compared to members of the population who are likely to be low-insight performers on a given prediction task and does so without using historical data about their performance on similar tasks. Instead we can perform outlier analysis to determine which forecasts the participant went against the convention wisdom, and then look at their NPW confidence to determine if they were self-aware that their picks were perceived as risky by the general population.

While many embodiments are described herein, it is appreciated that this invention can have a range of variations that practice the same basic methods and achieve the novel collaborative capabilities that have been disclosed above. Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

While the invention herein disclosed has been described by means of specific embodiments, examples and applications thereof, numerous modifications and variations could be made thereto by those skilled in the art without departing from the scope of the invention set forth in the claims.

What is claimed is:

1. A system for forecasting a future event by aggregating input from a group of users, the system comprising:
   a plurality of computing devices, each including a graphical display, a user interface, a forecasting application running on the computing device, and configured for network communication, wherein each computing device is associated with one member of the group of users;

a server in networked communication with each of the plurality of computing devices and including a server application running on the server, wherein the system is configured to:

display, on each of the computing devices, a forecasting prompt and a dynamic user interface for capturing an associated user's dynamic response to the forecasting prompt, wherein the dynamic user interface includes: a user-manipulatable marker that can be moved by the associated user to input a forecasting value responsive to the forecasting prompt, provide a first forecasting period during which the associated user of each of the plurality of computing devices independently adjusts the user-manipulatable marker to set an initial forecasting value responsive to the forecasting prompt, said initial forecasting value collected and stored by the server from each of the plurality of computing devices as provided by each member of the group of users;

after the first forecasting period has ended, display a perturbation stimulus on each of the plurality of computing devices, the perturbation stimulus based at least in part on data collected by the server from the plurality of computing devices during the first forecasting period;

provide a second forecasting period following the display of the perturbation stimulus wherein the second forecasting period starts at substantially the same time for all members, during which the associated user of each of the plurality of computing devices adjusts their user-manipulatable marker to set an updated forecasting value responsive to the forecasting prompt, said updated forecasting value collected and stored by the server from each of the plurality of computing devices as provided by each member of the group of users;

calculate an adjustment amount for each of the plurality of computing devices, the adjustment amount for each computing device indicating a change between the initial forecasting value and the updated forecasting value collected from that computing device in response to the perturbation stimulus; and after the second forecasting period has ended, calculate a final group forecast by aggregating data from the plurality of the computing devices, said calculating based at least in part on the adjustment amount computed for each of the plurality of the computing devices.

2. The system of claim 1 wherein the perturbation stimulus is based at least in part on the initial forecasting values collected from the plurality of computing devices.

3. The system of claim 1 wherein a different perturbation stimulus is provided to each of the plurality of computing devices, thereby providing a variety of perturbation stimuli across the group of users.

4. The system of claim 1 wherein the forecasting value is a probability.

5. The system of claim 1 wherein the forecasting value reflects a predicted score of a future sporting event.

6. The system of claim 1 wherein the calculating of the adjustment amount is based at least in part on a time delay between the perturbation stimulus and a detected adjustment of the user-manipulatable marker for each of at least a plurality of the plurality of computing devices.

* * * * *